US012700667B2

(12) United States Patent
Kim et al.

(10) Patent No.: US 12,700,667 B2
(45) Date of Patent: Aug. 4, 2026

(54) ANTENNA APPARATUS FOR VEHICLE AND CONTROLLING METHOD THEREFOR

(71) Applicant: Samsung Electronics Co., Ltd., Suwon-si (KR)

(72) Inventors: Hyunggon Kim, Suwon-si (KR); Seungjin Yu, Suwon-si (KR); Woong Lee, Suwon-si (KR); Yuseon Lee, Suwon-si (KR); Jaewoong Lee, Suwon-si (KR); Changwon Jang, Suwon-si (KR); Seungbum Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 18/179,776

(22) Filed: Mar. 7, 2023

(65) Prior Publication Data

US 2023/0223688 A1 Jul. 13, 2023

Related U.S. Application Data

(63) Continuation of application No. PCT/KR2021/012289, filed on Sep. 9, 2021.

(30) Foreign Application Priority Data

Sep. 10, 2020 (KR) ........................ 10-2020-0116237

(51) Int. Cl.
*H01Q 3/00* (2006.01)
*H01Q 3/26* (2006.01)
(Continued)

(52) U.S. Cl.
CPC ................. *H01Q 3/36* (2013.01); *H01Q 3/00* (2013.01); *H01Q 3/2694* (2013.01); *H01Q 1/32* (2013.01); *H01Q 1/3275* (2013.01); *H01Q 3/28* (2013.01)

(58) Field of Classification Search
CPC .. H01Q 3/26; H01Q 3/36; H01Q 3/24; H01Q 3/28; H01Q 3/2694; H01Q 3/00;
(Continued)

(56) References Cited

U.S. PATENT DOCUMENTS 6,853,329 B2 2/2005 Shinoda et al.
7,724,180 B2 * 5/2010 Yonak .................. H01Q 25/002 343/753

(Continued)

FOREIGN PATENT DOCUMENTS

CN 107069184 A 8/2017
CN 108432153 A 8/2018

(Continued)

OTHER PUBLICATIONS

International Search Report dated Dec. 14, 2021, issued in International Patent Application No. PCT/KR2021/012289.

(Continued)

*Primary Examiner* — Chuong P Nguyen
(74) *Attorney, Agent, or Firm* — Jefferson IP Law, LLP

(57) ABSTRACT

A vehicle antenna apparatus is provided. The vehicle antenna apparatus includes an array antenna including a plurality of antenna elements that output a plurality of beams identified by output directions, and a processor configured to perform at least one instruction. The processor is further configured to obtain speed information of a vehicle, select at least one beam from among the plurality of beams such that a shape of a beam pattern formed by the plurality of beams is changed based on the speed information, and control the array antenna to output the selected beam.

13 Claims, 27 Drawing Sheets

(51) Int. Cl.
*H01Q 3/36* (2006.01)
*H01Q 1/32* (2006.01)
*H01Q 3/28* (2006.01)

(58) Field of Classification Search
CPC ...... H01Q 1/32; H01Q 1/3233; H01Q 1/3275; H04B 7/0617
USPC ................................ 342/372, 371, 360, 350
See application file for complete search history.

(56) References Cited

U.S. PATENT DOCUMENTS 8,385,870 B2 2/2013 Lee et al.
9,391,368 B2 * 7/2016 Clevorn ............... H01Q 3/2605
9,774,384 B2 9/2017 Yun et al.
10,033,450 B2 7/2018 Strong
10,117,113 B2 10/2018 Braun et al.
10,605,911 B1 3/2020 Parker et al.
11,245,456 B2 2/2022 Mariner et al.
11,719,803 B2 * 8/2023 Zaidi ..................... G01S 13/931 342/70
11,733,375 B2 * 8/2023 Kim ........................ G01S 7/411 342/70
11,828,838 B2 * 11/2023 Lee ......................... G01S 13/56
12,025,728 B2 * 7/2024 Lee ......................... G01S 7/417
2008/0266169 A1 * 10/2008 Akita .................... G01S 13/931 342/117
2008/0272955 A1 * 11/2008 Yonak ................ H01Q 15/0086 342/54
2009/0021434 A1 * 1/2009 Lee ........................ H01Q 21/00 343/893
2011/0234448 A1 * 9/2011 Hayase ................. G01S 13/931 342/70
2014/0225775 A1 8/2014 Clevorn et al.
2014/0307704 A1 10/2014 Arogyaswami
2015/0009069 A1 1/2015 Yun et al.
2017/0117628 A1 4/2017 Banasky et al.
2018/0160424 A1 6/2018 Cavalcanti et al.
2020/0076040 A1 3/2020 Dogiamis et al.
2020/0168972 A1 5/2020 Dogiamis et al.
2024/0325913 A1 10/2024 Cai et al.
2025/0015907 A1 * 1/2025 Pfadler ................ H04B 17/318

FOREIGN PATENT DOCUMENTS

CN 109155659 A 1/2019
DE 10011263 A1 * 9/2001 ............. G01S 13/87
DE 10059891 A1 * 6/2002 ........... G01S 13/931
EP 4 339 857 A1 3/2024
JP 2626840 B2 7/1997
JP 2003163526 A2 6/2003
JP 2003-248055 A2 9/2003
JP 2017-022581 A 1/2017
JP 2017-146100 A 8/2017
JP 6516160 B2 5/2019
KR 10-2015-0005295 A 1/2015
KR 10-2017-0118487 A 10/2017
KR 10-2019-0076659 A 7/2019
KR 10-2087793 B1 4/2020
KR 10-2021-0147471 A 12/2021
KR 10-2024-0036766 A 3/2024
KR 10-2024-0046594 A 4/2024

OTHER PUBLICATIONS

Indian Office Action dated Nov. 27, 2024, issued in Indian Patent Application No. 202317026465.
Korean Office Action dated Sep. 2, 2024, issued in Korean Patent Application No. 10-2020-0116237.
Extended European Search Report dated Jan. 22, 2024, issued in European Patent Application No. 21867140.2.
Korean Office Action with English translation dated May 1, 2025; Korean Appln. No. 10-2020-0116237.
Chinese Office Action with English translation dated May 1, 2025; Chinese Appln. No. 202180062165.X.
European Office Action dated Oct. 20, 2025, issued in European Patent Application No. 21867140.2.
Korean Notice Of Allowance dated Jan. 26, 2026, issued in Korean Application No. 10-2020-0116237.
Chinese Office Action dated Mar. 1, 2026, issued in Chinese Application No. 202180062165.X.
Indian Hearing Notice dated Jan. 7, 2026, issued in Indian Application No. 202317026465.

* cited by examiner

FIG. 9

| Beam angle [°] | Phase shifter value | | | | |
|---|---|---|---|---|---|
| | Ant 1 | Ant 2 | Ant 3 | Ant 4 | · · · |
| -30 | 0 | -90 | -180 | -270 | · · · |
| -15 | 0 | -45 | -90 | -135 | · · · |
| 0 | 0 | 0 | 0 | 0 | · · · |
| 15 | 0 | 45 | 90 | 135 | · · · |
| 30 | 0 | 90 | 180 | 270 | · · · |

FIG. 17

1700

| Region (1710) | Beam_ID (1720) | Ant_Feed (1730) | Amplitude (1740) | Phase (1750) |
|---|---|---|---|---|
| A | 40 | 1:2;3;4 | a25;a26;a27;a28 | Φ25; Φ26; Φ27; Φ28 |
| A | 28 | 1:2;3;4 | a17;a18;a19;a20 | Φ17; Φ18; Φ19; Φ20 |
| A | 148 | 1:2;3;4 | a9;a10;a11;a12 | Φ9; Φ10; Φ11; Φ12 |
| A | 147 | 1:2;3;4 | a1;a2;a3;a4 | Φ1; Φ2; Φ3; Φ4 |

FIG. 20

2000

| Region (1710) | Beam_ID (1720) | Ant_Feed (1730) | Amplitude (1740) | Phase (1750) | |
|---|---|---|---|---|---|
| A | 40 | 1:2;3;4 | disable | disable | |
| A | 28 | 1:2;3;4 | disable | disable | |
| A | 148 | 1:2;3;4 | disable | disable | 2010 |
| A | 147 | 1:2;3;4 | a1;a2;a3;a4 | Φ1; Φ2; Φ3; Φ4 | |
| B | 30 | 1:2;3;4 | disable | disable | |
| B | 31 | 1:2;3;4 | disable | disable | |
| B | 151 | 1:2;3;4 | disable | disable | |
| B | 160 | 1:2;3;4 | b1;b2;b3;b4 | Φ1; Φ2; Φ3; Φ4 | 2020 |
| C | 37 | 1:2;3;4 | disable | disable | |
| C | 25 | 1:2;3;4 | c1;c2;c3;c4 | Φ1; Φ2; Φ3; Φ4 | 2030 |
| C | 54 | 1:2;3;4 | disable | disable | |
| C | 163 | 1:2;3;4 | disable | disable | |
| D | 24 | 1:2;3;4 | d1;d2;d3;d4 | Φ1; Φ2; Φ3; Φ4 | 2040 |
| D | 161 | 1:2;3;4 | disable | disable | |
| D | 162 | 1:2;3;4 | disable | disable | |
| D | 177 | 1:2;3;4 | disable | disable | |

FIG. 23

2300

1710 1720 1730 1740 1750

| Region | Beam_ID | Ant_Feed | Amplitude | Phase |
|---|---|---|---|---|
| AA | 40 | 1:2;3;4;5;6;7;8; 9:10;11;12;13;14;15;16 | disable | disable |
| AA | 28 | 1:2;3;4;5;6;7;8; 9:10;11;12;13;14;15;16 | disable | disable |
| AA | 30 | 1:2;3;4;5;6;7;8; 9:10;11;12;13;14;15;16 | disable | disable |
| AA | 31 | 1:2;3;4;5;6;7;8; 9:10;11;12;13;14;15;16 | disable | disable |
| AA | 148 | 1:2;3;4;5;6;7;8; 9:10;11;12;13;14;15;16 | disable | disable |
| AA | 147 | 1:2;3;4;5;6;7;8; 9:10;11;12;13;14;15;16 | disable | disable |
| AA | 151 | 1:2;3;4;5;6;7;8; 9:10;11;12;13;14;15;16 | disable | disable |
| AA | 160 | 1:2;3;4;5;6;7;8; 9:10;11;12;13;14;15;16 | b1;b2;b3;b4;b5;b6;b7;b8; b9;b10;b11;b12;b13;b14;b15;b15 | θ1;θ2;θ3;θ4;θ5;θ6;θ7;θ8; ;θ9;θ10;θ11;θ12;θ13;θ14;θ15;θ16; |
| AA | 37 | 1:2;3;4;5;6;7;8; 9:10;11;12;13;14;15;16 | disable | disable |
| AA | 25 | 1:2;3;4;5;6;7;8; 9:10;11;12;13;14;15;16 | disable | disable |
| AA | 24 | 1:2;3;4;5;6;7;8; 9:10;11;12;13;14;15;16 | disable | disable |
| AA | 161 | 1:2;3;4;5;6;7;8; 9:10;11;12;13;14;15;16 | disable | disable |
| AA | 54 | 1:2;3;4;5;6;7;8; 9:10;11;12;13;14;15;16 | disable | disable |
| AA | 163 | 1:2;3;4;5;6;7;8; 9:10;11;12;13;14;15;16 | disable | disable |
| AA | 162 | 1:2;3;4;5;6;7;8; 9:10;11;12;13;14;15;16 | disable | disable |
| AA | 177 | 1:2;3;4;5;6;7;8; 9:10;11;12;13;14;15;16 | disable | disable |

2310

ANTENNA APPARATUS FOR VEHICLE AND CONTROLLING METHOD THEREFOR

CROSS-REFERENCE TO RELATED APPLICATION(S)

This application is a continuation application, claiming priority under § 365 (c), of an International application No. PCT/KR2021/012289, filed on Sep. 9, 2021, which is based on and claims the benefit of a Korean patent application number 10-2020-0116237, filed on Sep. 10, 2020, in the Korean Intellectual Property Office, the disclosure of which is incorporated by reference herein in its entirety.

BACKGROUND

1. Field

The disclosure relates to a vehicle antenna apparatus and a method of controlling the same. More particularly, the disclosure relates to a vehicle antenna apparatus including an array antenna capable of controlling the direction of radio waves being transmitted or received, and a method of controlling the vehicle antenna apparatus.

2. Description of Related Art

Various functions have been developed and applied to meet the demand of users using vehicles and increase their convenience while using the vehicles.

For example, in-vehicle apparatuses for providing users with radio, television (TV), content, and various pieces of information necessary for driving have been developed. Information that may be provided to the user may be received by the vehicle through wireless communication. Therefore, in order to provide the user with various pieces of information, an antenna for performing wireless communication needs to be provided in the vehicle. The antenna may be installed inside or outside the vehicle.

Vehicle antennas are installed in vehicles that move at high speeds. Therefore, the vehicle antenna needs to transmit and receive radio waves such that seamless communication may be maintained even when the vehicle is moving at a high speed. Thus, it is necessary to provide a vehicle antenna apparatus capable of stably performing transmission and reception of radio waves even when the vehicle is moving at a high speed or conversely, at a low speed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a vehicle antenna apparatus for maintaining seamless communication, and a method of controlling the vehicle antenna apparatus.

Another aspect of the disclosure is to provide a vehicle antenna apparatus capable of stably performing transmission and reception of radio waves in response to a change in the movement speed of a vehicle, and a method of controlling the vehicle antenna apparatus.

Additional aspects will be set forth in part in the description which follows and, in part, will be apparent from the description, or may be learned by practice of the presented embodiments.

In accordance with an aspect of the disclosure, a vehicle antenna apparatus is provided. The vehicle antenna apparatus includes an array antenna including a plurality of antenna elements, which output a plurality of beams identified by output directions, and a processor configured to perform at least one instruction. The processor is further configured to obtain speed information of a vehicle, select at least one beam from among the plurality of beams such that a shape of a beam pattern formed by the plurality of beams is changed based on the speed information, and control the array antenna to output the selected at least one beam.

In addition, the processor may select at least one beam from among the plurality of beams based on first information, which is information about radiated power of the array antenna, such that the shape of the beam pattern formed by the plurality of beams is changed according to the speed information, and control the array antenna to output the selected beam.

In addition, the first information may be information about equivalent isotropic radiated power (EIRP) of the array antenna.

In addition, based on the speed information, the processor may control the array antenna such that the width of the beam pattern when the speed of the vehicle corresponds to a first speed value is wider than the width of the beam pattern when the speed of the vehicle is equal to a second speed value that is less the first speed value.

In addition, based on the speed information, the processor may control the array antenna such that the width of the beam pattern when the speed of the vehicle corresponds to the first speed value is narrower than the width of the beam pattern when the speed of the vehicle is equal to a third speed value that is greater than the first speed value.

In addition, the processor may adjust at least one of a phase and a signal strength applied to each of the plurality of antenna elements included in the array antenna such that at least one beam of the plurality of beams is selectively output.

In addition, the processor may group the plurality of beams into a plurality of groups, select at least one beam from each of the plurality of groups based on the first information, which is the information about the radiated power of the array antenna, and control the array antenna to output the selected beam.

In addition, each of the plurality of groups may include at least one adjacent beam. In addition, the number of beams included in each of the plurality of groups may increase in proportion to the speed of the vehicle.

In addition, the processor may classify a speed section of the vehicle into a first speed section and a second speed section, which includes values greater than values included in the first speed section, upon a speed of the vehicle being within the first speed section, group the plurality of beams such that n beams are included in each of the plurality of groups, and upon the speed of the vehicle being within the second speed section, group the plurality of beams such that m beams are included in each of the plurality of groups, wherein m is greater than n.

In addition, the processor may classify a speed section of the vehicle into a first speed section, a second speed section, which includes values greater than values included in the first speed section, and a third speed section, which includes values greater than the values included in the second speed section, upon a speed of the vehicle being within the first speed section, group the plurality of beams such that 1 beams are included in each of the plurality of groups, upon the speed of the vehicle being within the second speed section, group the plurality of beams such that m beams are included in each of the plurality of groups, wherein m is greater than n, and upon the speed of the vehicle being within the third speed section, group the plurality of beams such that n beams are included in each of the plurality of groups, wherein n is greater than m.

In addition, the processor may group the plurality of beams into a plurality of groups, select at least one beam from each of the plurality of groups based on EIRP values of the array antenna, and control the array antenna to output the selected beam.

In addition, the processor may select one beam having a maximum EIRP value from each of the plurality of groups, and control the array antenna to output the selected beam.

In accordance with another aspect of the disclosure, a method of controlling a vehicle antenna apparatus including an array antenna including a plurality of antenna elements, which output a plurality of beams identified by output directions is provided. The method of controlling a vehicle antenna apparatus includes obtaining speed information of a vehicle, selecting at least one beam from among the plurality of beams such that a shape of a beam pattern formed by the plurality of beams is changed based on the speed information, and controlling the array antenna to output the selected beam.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a diagram for describing a phase adjustment operation performed by an array antenna according to an embodiment of the disclosure;

FIG. 17 is a diagram illustrating an example of a beam codebook used to control generation and output of a plurality of beams output from an array antenna according to an embodiment of the disclosure;

FIG. 20 is another diagram for describing beam selection and output control operations according to an embodiment of the disclosure;

FIG. 23 is another diagram for describing beam selection and output control operations according to an embodiment of the disclosure;

Throughout the drawings, it should be noted that like reference numbers are used to depict the same or similar elements, features, and structures.

DETAILED DESCRIPTION

Figure 1:
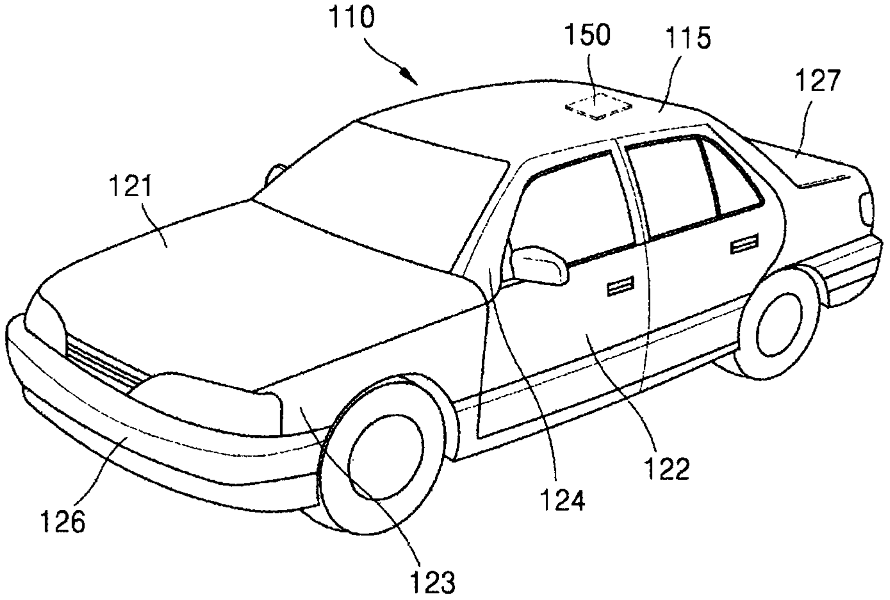
FIG. 1 is a diagram illustrating a vehicle in which an antenna apparatus is installed according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, phrases such as "in some embodiments" or "in an embodiment" do not necessarily indicate the same embodiment.

Some embodiments may be represented by functional blocks and various process operations. Some or all of the functional blocks may be implemented by any number of hardware and/or software elements that perform particular functions. For example, the functional blocks of the disclosure are implemented by using one or more processors or microprocessors, or circuit elements for performing intended functions. For example, the functional blocks of the disclosure are implemented by using various programming or scripting languages. The functional blocks may be implemented by using various algorithms executable by one or more processors. Furthermore, the disclosure may employ known technologies for electronic settings, signal processing, and/or data processing. Terms such as 'module' or 'component' may be used broadly and may not be limited to mechanical and physical elements.

In addition, connection lines or connection members between components illustrated in the drawings are merely ~~ of functional connections and/or physical or circuit connections. Various alternative or additional functional connections, physical connections or circuit connections may be present in a practical device.

In addition, the expression 'at least one of a, b, or c' indicates only a, only b, only c, both a and b, both a and c, both b and c, or all of a, b, and c.

A vehicle antenna apparatus, a method of controlling the same, and a recording medium having recorded thereon a program for performing the method according to the embodiments disclosed herein will be described in detail with reference to the accompanying drawings. In the attached drawings, like elements are illustrated by using like reference numerals. In addition, throughout the detailed description, the same components are described with the same terms.

An antenna apparatus according to an embodiment of the disclosure refers to an electronic device that includes an array antenna including a plurality of antenna elements for transmitting and receiving radio waves, and generates and controls radio waves such that the radio waves are transmitted and received in a desired direction or to a desired destination. In addition, the vehicle antenna apparatus may be referred to as an antenna apparatus, an antenna, an antenna module, an antenna system, and the like.

The location where the antenna apparatus according to an embodiment of the disclosure is installed will be described in detail below with reference to FIG. 1.

FIG. 1 is a diagram illustrating a vehicle in which an antenna apparatus is installed according to an embodiment of the disclosure.

The vehicle antenna apparatus according to an embodiment of the disclosure may be arranged outside or inside the vehicle.

In detail, the vehicle antenna apparatus may be installed in a shark fin module located on the glass or roof, which is the exterior of the vehicle.

Alternatively, the vehicle antenna apparatus according to an embodiment of the disclosure may be installed inside the vehicle. In a case in which the antenna is installed on the glass of the vehicle, upon the glass being damaged due to an external impact, the antenna may also be damaged, and the length of a cable connecting the antenna to a printed circuit board (PCB) module may be increased. In addition, in a case in which two or more antennas are installed or mounted on the glass to support diversity, there may be an isolation issue between the antennas. In addition, because the shark fin module is exposed to the outside of the vehicle, there is also a risk of damage due to an external impact. In addition, as the shark fin module has a small size, the size of the antenna is also reduced, which may deteriorate the radiation capability (or the broadcast reception capability) of the antenna, and in a case in which multiple antennas need to be installed to receive various broadcast signals, the number of shark fin modules may be increased. In a case in which the vehicle antenna apparatus is installed inside the vehicle, the vehicle antenna apparatus is not exposed to the outside of the vehicle, unlike the antennas installed on the glass or shark fin module as described above. Therefore, the risk of damage may be reduced.

Hereinafter, an example will be described and illustrated in which the vehicle antenna apparatus is installed inside the vehicle.

Referring to FIG. 1, an antenna apparatus (not shown) may be installed in a lower portion of an area 150 on a metal panel 115 forming the body of a vehicle 110. In detail, the area 150 of the metal panel (e.g., 115) may be opened such that the antenna apparatus (not shown) may be arranged inside the vehicle 110 and on the lower portion of the area 150. In addition, the area 150 may not be formed of a metal material. In detail, the area 150 on the metal panel (e.g., 115) may be formed of a material that does not block radio waves (e.g., a non-metallic material).

In addition, although FIG. 1 illustrates an example in which the antenna apparatus (not shown) is installed in the area 150 in an upper portion of the vehicle 110, which is inside the vehicle 110, the antenna apparatus (not shown) may be installed at any position, as long as it is installed inside or outside the vehicle 110.

In detail, the antenna apparatus (not shown) may be installed in a lower or inner area of at least one of a bonnet panel 121, a door panel 122, a fender panel 123, a pillar panel 124, a roof panel (i.e., metal panel 115), a bumper panel 126 and a trunk panel 127 of the vehicle.

The door panel 122 may include not only a front door panel on the driver's seat side illustrated in FIG. 1, but also a rear door panel on the driver's seat side, a front door panel on the passenger's seat side, and a rear door panel on the passenger's seat side. In addition, the fender panel 123 may include not only a front fender panel on the driver's seat side illustrated in FIG. 1, but also a rear fender panel on the driver's seat side, a front fender panel on the passenger's seat side, and a rear fender panel on the passenger's seat side. In addition, the pillar panel 124 may include not only a front pillar panel on the driver's seat side illustrated in FIG. 1, but also a rear pillar panel on the driver's seat side, a front pillar panel on the passenger's seat side, and a rear pillar panel on the passenger's seat side. In addition, the bumper panel 126 may include not only a front bumper panel illustrated in FIG. 1 but also a rear bumper panel.

Figure 2:
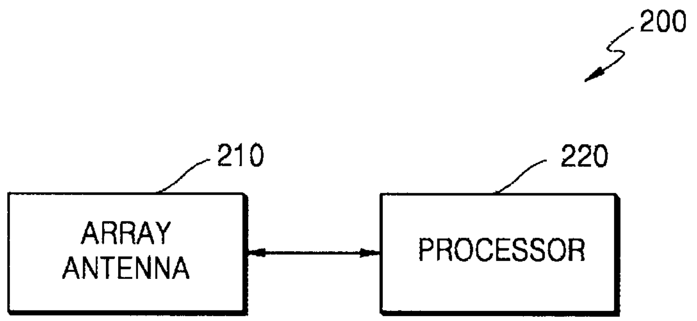
FIG. 2 is a block diagram illustrating an antenna apparatus according to an embodiment of the disclosure.

FIG. 2 is a block diagram illustrating an antenna apparatus according to an embodiment of the disclosure. As described above with reference to FIG. 1, an antenna apparatus 200 illustrated in FIG. 2 may be installed in an area inside or outside of a vehicle.

The vehicle antenna apparatus 200 according to an embodiment of the disclosure is an antenna apparatus to be installed in a vehicle for wireless communication between the vehicle and an external device, and transmits and receives radio waves through at least one antenna element.

In addition, the vehicle antenna apparatus 200 according to an embodiment of the disclosure may be an antenna apparatus that performs wireless communication in a preset frequency band. The frequency band used for wireless communication may vary depending on a communication standard or a communication type being used.

In detail, the vehicle antenna apparatus 200 according to an embodiment of the disclosure may be a directional antenna apparatus that supports millimeter waves (mmWAVE). The millimeter wave is a radio signal having a frequency band between 30 GHz and 300 GHz, and has a wavelength ranging from 1 mm to 10 mm. The vehicle antenna apparatus according to an embodiment of the disclosure may precisely control the shape and direction of a radio signal being transmitted or received, by transmitting or receiving millimeter-wave radio waves.

In addition, the vehicle antenna apparatus according to an embodiment of the disclosure may be integrated with a vehicle communication module (not shown). The vehicle communication module (not shown) may be referred to as a transmission control unit (TCU). The TCU is a component to control transmission and reception of data through wireless communication in a vehicle, and may be in charge of communication between the vehicle and an external electronic device (e.g., a server, a mobile device, and the like). The antenna apparatus according to an embodiment of the disclosure may be installed inside the vehicle communication module, or may be integrated with the vehicle communication module.

Referring to FIG. 2, the vehicle antenna apparatus 200 includes an array antenna 210 and a processor 220.

The array antenna 210 includes a plurality of antenna elements that output a plurality of beams identified by their output directions.

Each of the plurality of antenna elements may at least one of transmit or receive radio signals. In detail, a radio signal output from each of the plurality of antenna elements included in the array antenna 210 may be transmitted or received toward a desired direction. As described above, when the array antenna 210 has directivity for transmitting or receiving radio signals in a desired direction, an output radio signal having directivity may be referred to as a beam. That is, the plurality of antenna elements included in the array antenna 210 may output a plurality of beams. The shape of a radio wave formed by the plurality of beams output from the array antenna 210 may be referred to as a beam pattern.

In detail, the array antenna 210 may transmit and receive a radio signal, which is a wireless signal of a certain frequency band, under control by the processor 220. For example, the array antenna 210 transmits and receives a millimeter-wave (mmWAVE) radio signal having a wavelength ranging from 1 mm to 10 mm, and having a frequency band between 30 GHz and 300 GHz. Hereinafter, an example will be described in which the array antenna 210 transmits and receives millimeter-wave radio signals.

In detail, the array antenna 210 may be formed as a phased array antenna. The phased array antenna may refer to an antenna in which each of the plurality of antenna elements included in the array antenna 210 is arranged in a straight line direction, and the phase of a radio signal output from each of the plurality of antenna elements may be adjusted according to a desired direction.

The detailed configuration and operations of the array antenna 210 will be described in detail below with reference to FIGS. 5 to 12.

The processor 220 executes at least one instruction to perform operations according to an embodiment of the disclosure. That is, the processor 220 may execute the at least one instruction to control an intended operation to be performed.

In detail, the processor 220 executes the at least one instruction to obtain speed information of the vehicle. Then, based on the obtained speed information, the processor 220 selects at least one of the plurality of beams such that the shape of a beam pattern formed by the plurality of beams output from the plurality of antenna elements included in the array antenna 210 is changed. Then, the processor 220 controls the array antenna 210 to output the selected beam. Operations, performed by the processor 220, of selecting and output a beam will be described in detail below with reference to FIGS. 13 to 23.

In detail, the processor 220 may include an internal memory (not shown) and at least one processor (not shown) configured to execute at least one stored program. The internal memory (not shown) of the processor 220 may store one or more instructions. Also, the processor 220 may execute at least one of the one or more instructions stored in the internal memory (not shown) to perform a certain operation.

In detail, the processor 220 may include random-access memory (RAM) (not shown) storing signals or data input from the outside or used as a storage area corresponding to various tasks performed by the antenna apparatus 200, read-only memory (ROM) (not shown) storing a control program for controlling the antenna apparatus 200 and/or a plurality of instructions, and at least one processor (not shown).

Alternatively, the processor 220 may be implemented as a system-on-chip (SoC) in which a core (not shown) and a graphics processing unit (GPU) (not shown) are integrated. Alternatively, the processor 220 may include a single processor core (single-core) or a plurality of processor cores (multi-core). For example, the processor 220 is a dual-core, a triple-core, a quad-core, a hexa-core, an octa-core, a deca-core, a dodeca-core, a hexadecimal-core, and the like.

In addition, the processor 220 may include components for implementing a hardware platform (e.g., an application processor (AP), memory, and the like), and components for implementing a software platform (e.g., an operating system (OS) program, software for phase control of radio signals output from the array antenna 210 (e.g., automotive safety software), applications, and the like).

In addition, at least one of the operations performed by the processor 220 may be performed by using artificial intelligence (AI) technology. The at least one operation performed by using AI technology will be described in detail below with reference to FIG. 24.

Figure 3:
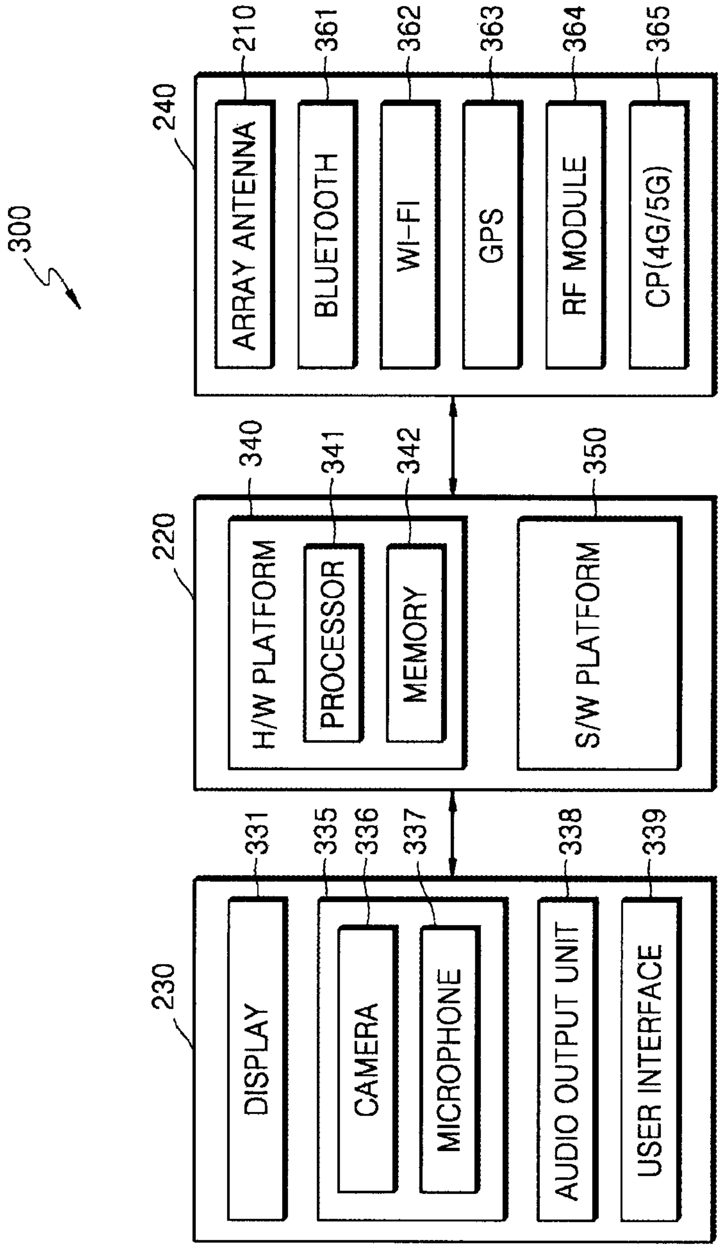
FIG. 3 is a block diagram illustrating a vehicle electronic device including the antenna apparatus of FIG. 2 according to an embodiment of the disclosure.

FIG. 3 is a block diagram illustrating a vehicle electronic device including the antenna apparatus of FIG. 2 according to an embodiment of the disclosure.

A vehicle electronic device 300 of FIG. 3 may include the vehicle antenna apparatus 200 described above with reference to in FIG. 2. In addition, the vehicle electronic device 300 may refer to a computing device that may be integrated with the vehicle antenna apparatus 200 and then installed in a vehicle. Therefore, in describing the vehicle electronic device 300, descriptions provided above regarding the vehicle antenna apparatus 200 will be omitted. Also, in the vehicle electronic device 300 illustrated in FIG. 3, the same components as those described above with reference to FIG. 2 are illustrated by using the same reference numerals and terms.

Referring to FIG. 3, the vehicle electronic device 300 may include the processor 220, an input/output unit 230 and a communication unit 240. In detail, the vehicle electronic device 300 includes the vehicle antenna apparatus 200, and the vehicle antenna apparatus 200 may be integrated with the communication unit 240, which is a TCU configured to perform communication in a vehicle.

Also, the vehicle electronic device 300 may be an electronic device for implementing in-vehicle infotainment (IVI) technology. For example, the vehicle electronic device 300 provides at least one of services, information, or content customized for a particular user, based on user location information. In detail, the vehicle electronic device 300 may perform communication between the vehicle and an external device, to be used to obtain information necessary for driving or using the vehicle. Alternatively, the vehicle electronic device 300 may perform communication between the vehicle and an external device to provide the user with at least one of services, information, or content.

The processor 220 and the input/output unit 230 included in the vehicle electronic device 300 may be collectively referred to as an IVI head unit. In addition, the vehicle electronic device 300 may be arranged between center front portions of the driver's seat and the passenger's seat in the vehicle. In this case, the array antenna 210 included in the vehicle electronic device 300 may be installed at a position spaced apart from other components included in the vehicle electronic device 300, and the array antenna 210 may be connected to the other components of the vehicle electronic device 300 through a wired communication interface, such as a cable, or through a wireless communication interface.

In addition, the communication unit 240 may be referred to as a TCU.

The TCU is a component to control transmission and reception of data in a vehicle, and may be in charge of communication between the vehicle and an external electronic device (e.g., a server, a mobile device, etc.).

The processor 220 may include components 340 for implementing a hardware platform (e.g., an AP, memory, and the like), and components 350 for implementing a software platform (e.g., an OS program, automotive safety software, applications, and the like).

In detail, the components 340 for implementing the hardware platform may include at least one AP 341 and a memory 342. An example is described in which the memory 342 is included in the processor 220. In addition, the memory 342 may not be included in the processor 220 but may be included as a separate component included in the vehicle electronic device 300.

In addition, the components 340 for implementing the hardware platform may further a Universal Serial Bus (USB) module (not shown), a frequency modulation (FM)/digital multimedia broadcasting (DMB) tuner (not shown), and the like. The USB module (not shown) may include a USB insertion unit (not shown) to read data from a USB device inserted therein. Also, the FM/DMB tuner (not shown) may selectively receive FM/DMB broadcast signals. In detail, the FM/DMB tuner (not shown) may be tuned to and select only a frequency of a channel desired to be received by the vehicle electronic device 300 from among a number of radio wave components by performing, for example, amplification, mixing, and resonance on a broadcast signal received in a wired or wireless manner. The broadcast signal received by the FM/DMB tuner (not shown) may include an audio, a video, and additional information (e.g., an electronic program guide (EPG)).

The components 350 for implementing the software platform may include an OS program, automotive safety software, applications, and the like. The OS program may include QNX, Linux, or an Android-based OS program.

The input/output unit 230 is a component for providing data to a user or receiving a user request, and may include at least one of a display 331, a camera module 335, an audio output unit 338, and a user interface 339.

The camera module 335 is a component for obtaining at least one of video or audio data, and may include a camera 336 and a microphone 337. In addition, the camera module 335 may include a speaker (not shown) to output an operating sound or the like of the camera 336. In addition, in a case in which the camera module 335 does not include a separate speaker (not shown), an operating sound or the like of the camera 336 may be output through the audio output unit 338.

For example, the camera module 335 may operate as a sensor for recognizing a gesture and a voice of a user.

In detail, the camera 336 may receive an image (e.g., consecutive frames) corresponding to a motion of the user, including a gesture, within a recognition range of a camera. For example, the recognition range of the camera 336 may be within a distance of 0.1 m to 5 m between the camera 336 and the user. The motion of the user may include, for example, a gesture or motion of a body part of the user, such as the face, a facial expression, a hand, a fist, or a finger. Under control by the processor 220, the camera 336 may convert the received image into an electrical signal to perform recognition, and may select a menu displayed on the vehicle electronic device 300 or perform control corresponding to a motion recognition result by using a recognition result corresponding to the motion of the user. For example, the processor 220 controls channel selection, channel change, volume adjustment, execution of available services, and the like, in FM/DMB by using the recognition result obtained from the camera 336.

The camera 336 may be integrated with or separate from the vehicle electronic device 300. The separate camera 336 may be electrically connected to the processor 220 of the vehicle electronic device 300 through the communication unit 240 or the input/output unit 230. For example, in a case in which the camera 336 is separate from the vehicle electronic device 300, the camera 336 is arranged at a position corresponding to the front of the face and upper body of a driver to capture an image corresponding to the face and upper body of the driver.

The microphone 337 may receive an audio signal such as a voice signal. The microphone 337 may receive a voice signal of the user, and the processor 220 may recognize a control command corresponding to a voice received from the microphone 337 and perform control such that an operation corresponding to the voice is performed. In addition, the microphone 337 may be included in the vehicle electronic device 300 as a separate module, rather than being included in the camera module 335.

The user interface 339 may receive a user input for controlling the vehicle electronic device 300. The user interface 339 may include a push button, a wheel, a keyboard, a jog dial, a touch panel, a haptic sensor, and the like, for receiving a user input.

The communication unit 240 may include at least one communication module configured to perform wireless communication. In detail, the communication unit 240 may include the array antenna 210. In detail, the communication unit 240 may include at least one of the array antenna 210, a Bluetooth module 361, a Wi-Fi module 362, a global positioning system (GPS) module 363, a radio frequency (RF) module 364, or a communication processor (CP) module 365. The CP module is a modem chipset, and may perform communication with an external electronic device through a communication network conforming to 3$^{rd}$ Generation (3G), 4$^{th}$ Generation (4G), 5$^{th}$ Generation (5G), or 6$^{th}$ Generation (6G) communication standards. In addition, the communication unit 240 may further include at least one communication module (not shown) configured to perform communication according to a communication standard, such as Bluetooth, Wi-Fi, Bluetooth Low Energy (BLE), near-field communication (NFC)/radio frequency identification (RFID), Wi-Fi Direct, ultra-wideband (UWB), and/or Zigbee.

In addition, the array antenna 210 may be included in at least one of the RF module 364 and the CP module 365, to perform transmission and reception of radio waves of each of the RF module 364 and the CP module 365.

In addition, the components included in the vehicle electronic device 300, for example, the processor 220, the input/output unit 230, and the communication unit 240, communicate with each other through a vehicle network. Also, the vehicle electronic device 300 and other components included in the vehicle (not shown) may communicate with each other through the vehicle network. The vehicle network may be a network based on a controller area network (CAN) and/or Media-Oriented Systems Transport (MOST).

Figure 4:
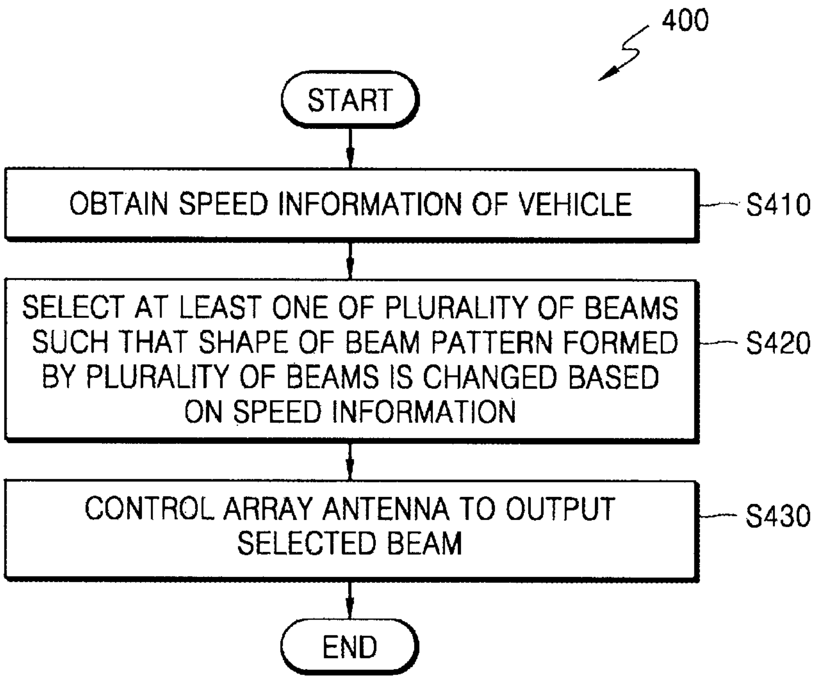
FIG. 4 is a flowchart illustrating a method of controlling an antenna apparatus according to an embodiment of the disclosure.

FIG. 4 is a flowchart illustrating a method of controlling an antenna apparatus according to an embodiment of the disclosure.

Also, FIG. 4 may be a flowchart illustrating operations performed by the vehicle antenna apparatus 200 or the vehicle electronic device 300 according to an embodiment of the disclosure described above with reference to FIGS. 1 to 3. In detail, a method 400 of controlling a vehicle antenna apparatus may be performed by the vehicle antenna apparatus 200 or the vehicle electronic device 300. Therefore, in describing the method 400 of controlling a vehicle antenna apparatus for the vehicle illustrated in FIG. 4, the descriptions of the vehicle antenna apparatus 200 or the vehicle electronic device 300 provided above with reference to FIGS. 1 to 3 may be omitted.

In addition, an example will be described in which the method 400 of controlling a vehicle antenna apparatus illustrated in FIG. 4 is performed by the vehicle antenna apparatus 200 illustrated in FIG. 2.

Referring to FIG. 4, the method 400 of controlling a vehicle antenna apparatus is a method of controlling the vehicle antenna apparatus 200 including the array antenna 210 including the plurality of antenna elements, which output a plurality of beams identified by their output directions.

The vehicle antenna apparatus 200 obtains speed information of the vehicle in operation S410. The operation S410 will be described in more detail below with reference to FIG. 5.

In addition, the method 400 of controlling a vehicle antenna apparatus includes selecting at least one of the plurality of beams such that the shape of a beam pattern formed by the plurality of beams is changed based on the speed information obtained in operation S410 (S420). The operation S420 may be performed by the processor 220.

Subsequently, the method 400 of controlling a vehicle antenna apparatus includes controlling the array antenna 210 to output the beam selected in operation S420 (S430). The operation S430 may be performed by the processor 220.

Figure 5:
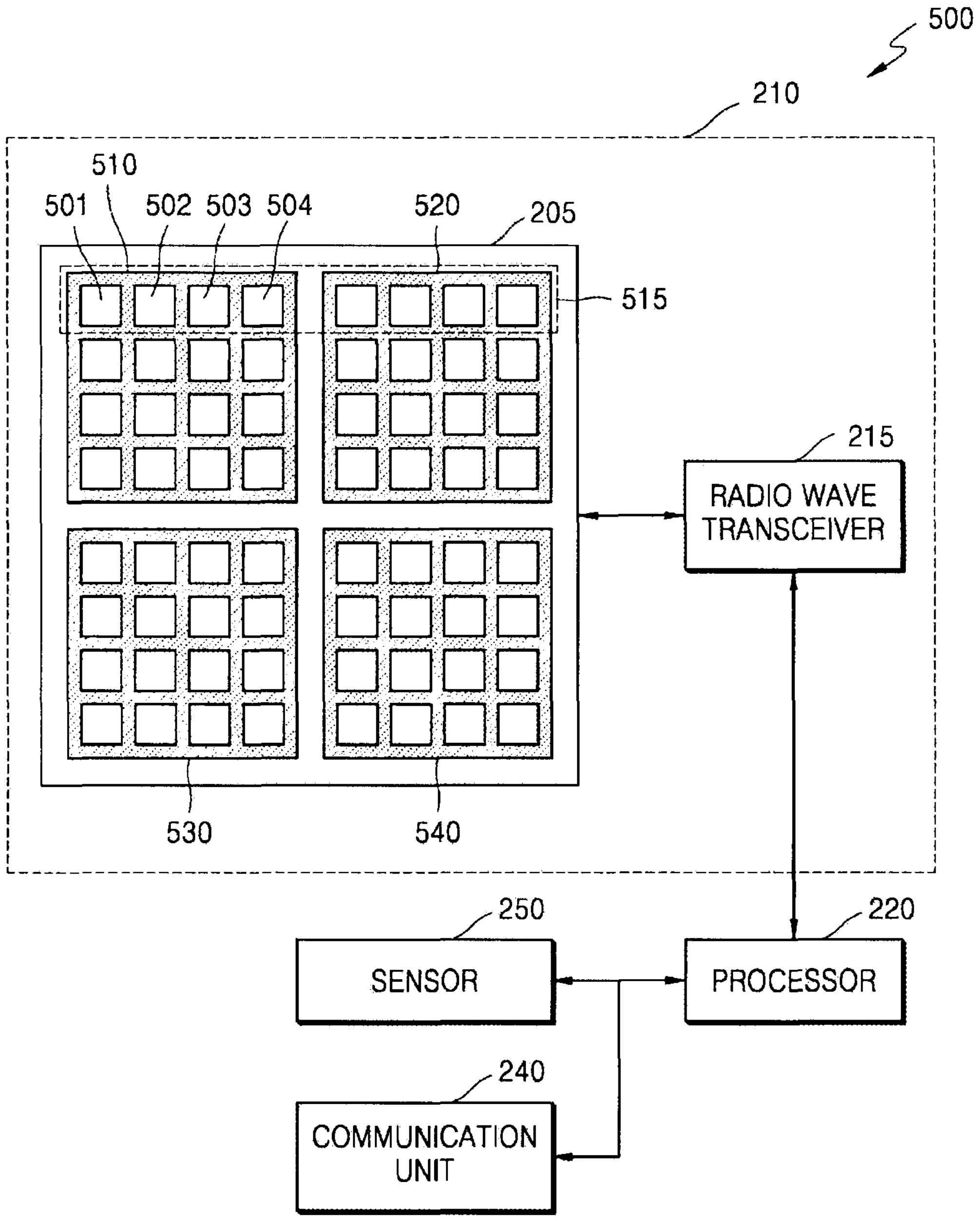
FIG. 5 is a diagram illustrating in more detail an antenna apparatus according to an embodiment of the disclosure.

FIG. 5 is a diagram illustrating in more detail an antenna apparatus according to an embodiment of the disclosure. A vehicle antenna apparatus 500 illustrated in FIG. 5 may equally correspond to the vehicle antenna apparatus 200 of FIG. 2. The same components included in the vehicle antenna apparatus 500 as those illustrated in FIG. 2 are illustrated by using the same reference numerals, and thus, detailed descriptions thereof will be omitted. In addition, the method 400 of controlling a vehicle antenna apparatus described above with reference to FIG. 4 may be performed by the vehicle antenna apparatus 500.

Referring to FIG. 5, the array antenna 210 may include an array 205 including a plurality of antenna elements, and a radio wave transceiver 215 for generating, processing, and/or outputting signals transmitted and received through the array 205. Also, the array antenna 210 may be referred to as an antenna module.

The array 205 refers to a set in which a plurality of antenna elements that transmit or receive radio signals are arranged. The array 205 is a set of arranged antenna elements, and thus may be referred to as an array antenna.

Each of the plurality of antenna elements included in the array 205 receives an input of a radio signal having a certain signal magnitude (or gain), a certain phase, and a certain frequency from the radio wave transceiver 215, and radiates radio waves corresponding to the input radio signal. Accordingly, each of the plurality of antenna elements may output at least one beam identified by its output direction to be distinguished from other beams.

In addition, each of the plurality of antenna elements included in the array 205 may receive a radio wave corresponding to a certain signal magnitude (or gain), a certain phase, and a certain frequency, and transmit, to the radio wave transceiver 215, a radio wave signal corresponding to the received radio wave.

In an embodiment of the disclosure, the array 205 may include 4*4=16 antenna elements in sub-array elements 510, 520, 530 and 540, including 4 antenna elements arranged in a row direction and 4 antenna elements in a column direction. In addition, as another example, the array 205 may include 8*8=64 antenna elements. The number and arrangement of antenna elements included in the array 205 may vary.

A plurality of antenna elements arranged together in at least one of the row and column directions may be referred to as an 'antenna element group'. The array 205 may include a plurality of antenna element groups described above. For example, the array 205 may include four antenna element groups each including 4*4=16 antenna elements arranged together. Alternatively, the array 205 may include one antenna element group including 8*8-64 antenna elements. In an example including FIG. 2, a case in which the array 205 includes one antenna element group including 8*8=64 antenna elements will be described and illustrated as an example.

The radio wave transceiver 215 may generate, process, and/or output signals transmitted and received through the array 205. In detail, the radio wave transceiver 215 may generate a radio signal having a certain phase and a certain frequency. The radio signal generated by the radio wave transceiver 215 may be output through the array 205. In addition, when a radio wave having a certain phase and a certain frequency is received by the array 205, the radio wave transceiver 215 may receive and process a signal corresponding to the radio wave received by the array 205.

In detail, the radio wave transceiver 215 may process the radio signal to have a certain phase and frequency. In detail, in order to transmit a radio signal, the radio wave transceiver 215 may perform transmit beamforming (Tx beamforming) to generate the radio signal to have a certain gain, a certain phase, and a certain frequency. In addition, in order to receive a radio signal, the radio wave transceiver 215 may perform receive beamforming (Rx beamforming) to receive and process a radio wave corresponding to a certain phase and frequency. Beamforming may refer to an operation of radiating or receiving a beam having a particular shape. In detail, beamforming may refer to an operation of outputting or receiving a beam having a particular direction and gain (or signal strength).

In detail, in a case in which a plurality of antenna elements are arranged, beamforming may refer to an operation of adjusting the radiation directions of all beams by adjusting the phases of signals applied to the arranged antenna elements. The distribution pattern of radio waves formed by 'all beams' may be referred to as a beam pattern.

In an embodiment of the disclosure, the radio wave transceiver 215 may generate a phase-adjusted radio signal under control by the processor 220. In detail, the processor 220 may determine the phase of a radio signal and control the array antenna 210 including the radio wave transceiver 215 to transmit and receive a radio signal having the determined phase.

In addition, the vehicle antenna apparatus 500 may further include the communication unit 240 described above with reference to FIG. 3. The communication unit 240 is described in detail above with reference to FIG. 3, and thus, a detailed description thereof will be omitted.

In addition, the vehicle antenna apparatus 500 may further include a sensor 250, in addition to the components of the vehicle antenna apparatus 200.

The sensor 250 may include a sensor that detects the speed of the vehicle. In detail, the sensor 250 may be a speed sensor, such as a speed meter. In a case in which the vehicle antenna apparatus 500 includes the sensor 250, operation S410 may be performed by the processor 220 based on a result of detection by the sensor 250. In detail, the processor 220 may receive a detection result obtained in real time by the sensor 250 and calculate the speed of the vehicle based the detection result. Alternatively, in a case in which the sensor 250 directly detects the speed of the vehicle in real time, speed information of the vehicle obtained by the sensor 250 may be transmitted to the processor 220.

In detail, the sensor 250 may monitor the speed of the vehicle in real time and transmit, to the processor 220, a detection result of monitoring. Alternatively, the sensor 250 may monitor the amount of change in the speed of the vehicle in real time and transmit, to the processor 220, the monitored amount of change in the speed. The processor 220 having received the detection result from the sensor 250 may obtain information about the speed of the vehicle.

In addition, in a case in which the vehicle antenna apparatus 500 does not include the sensor 250, speed information of the vehicle may be transmitted from the outside to the processor 220 through the communication unit 240 of the vehicle antenna apparatus 500. For example, a GPS server (not shown) providing a navigation service transmits, to the GPS module 363, speed information of the vehicle. In this case, the processor 220 may receive vehicle speed information through the GPS module 363 and then perform operation S420.

Figure 6:
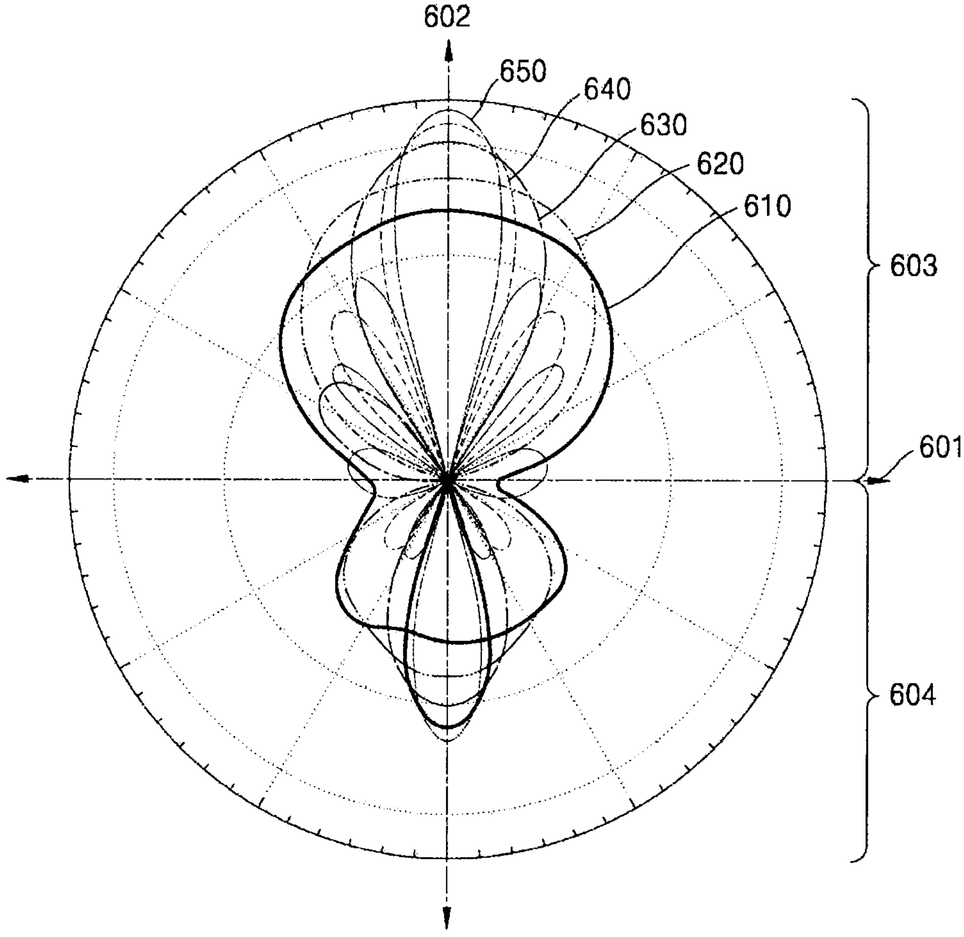
FIG. 6 is a diagram illustrating a beam pattern radiated from an array antenna according to an embodiment of the disclosure.

FIG. 6 is a diagram illustrating a beam pattern radiated from an array antenna according to an embodiment of the disclosure.

Referring to FIG. 6, a beam pattern, which is a distribution of beams output from the array antenna 210 described above with reference to FIGS. 2 and 5, may vary depending on the number of antenna elements included in the array antenna 210. The beam pattern may include at least one beam identified by its output direction to be distinguished from other beams. In addition, the beams output from the array antenna 210 may include beams 603 formed in a direction in which radio waves are to be transmitted, and beams 604 formed in the opposite direction.

Referring to FIG. 6, a reference point, which is the intersection of an X axis 601 and a Y axis 602, may be the center position of the array antenna 210. In addition, the Y axis 602 may indicate the front vertical direction of a plane in which the array 205 of the array antenna 210 is arranged. Also, the Y axis 602 may represent the output value or gain value of a beam.

For example, a beam pattern 610 represents a distribution of output beams in a case in which the number of antenna elements included in the array antenna 210 is one. In addition, a beam pattern 620 represents a distribution of output beams in a case in which the number of antenna elements included in the array antenna 210 is two. In addition, a beam pattern 630 represents a distribution of output beams in a case in which the number of antenna elements included in the array antenna 210 is four. In addition, a beam pattern 640 represents a distribution of output beams in a case in which the number of antenna elements included in the array antenna 210 is eight. In addition, a beam pattern 650 represents a distribution of output beams in a case in which the number of antenna elements included in the array antenna 210 is eight.

That is, as illustrated in FIG. 6, as the number of antenna elements included in the array antenna 210 increases, the shape of the beam may become sharp, and the shape of the beam pattern formed by at least one beam may also become sharp. In addition, as the number of antenna elements included in the array antenna 210 increases, the maximum output value or gain value of the beam increases.

That is, by increasing the number of antenna elements included in the array antenna 210, directivity that enables transmission and reception of strong radio waves having a greater gain in a particular direction may be enhanced.

An operation of controlling the directivity of the array antenna 210 and detail configurations thereof will be described in detail below with reference to FIGS. 7 to 10.

Figure 7:
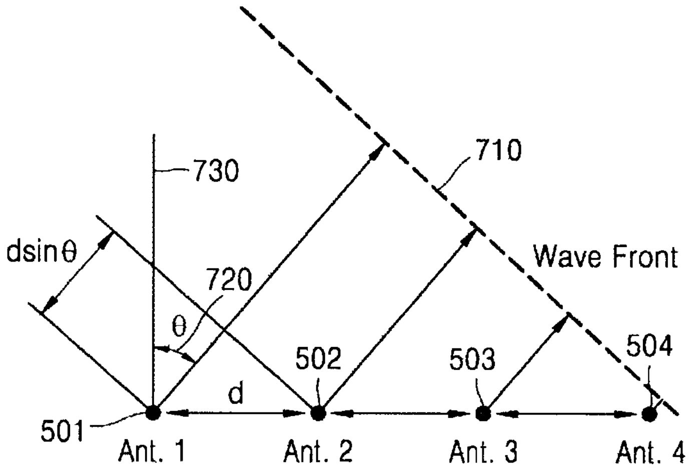
FIG. 7 is a diagram for describing a phase adjustment operation performed by an array antenna according to an embodiment of the disclosure.

FIG. 7 is a diagram for describing a phase adjustment operation performed by an array antenna according to an embodiment of the disclosure.

Referring to FIG. 7, the array 205 included in an array antenna 210 may include a plurality of antenna elements 501, 502, 503, and 504. The arrangement interval between the antenna elements 501, 502, 503, and 504 may be d. The output direction of the array antenna 210 may be represented by the value of 720 with respect to a direction 730 perpendicular to the plane on which the array 205 is arranged. That is, in a case in which the direction of each of beams output from the respective antenna elements 501, 502, 503, and 504 is a direction represented by the value of 720, the wave front may be expressed as a plane 710.

Figure 8:
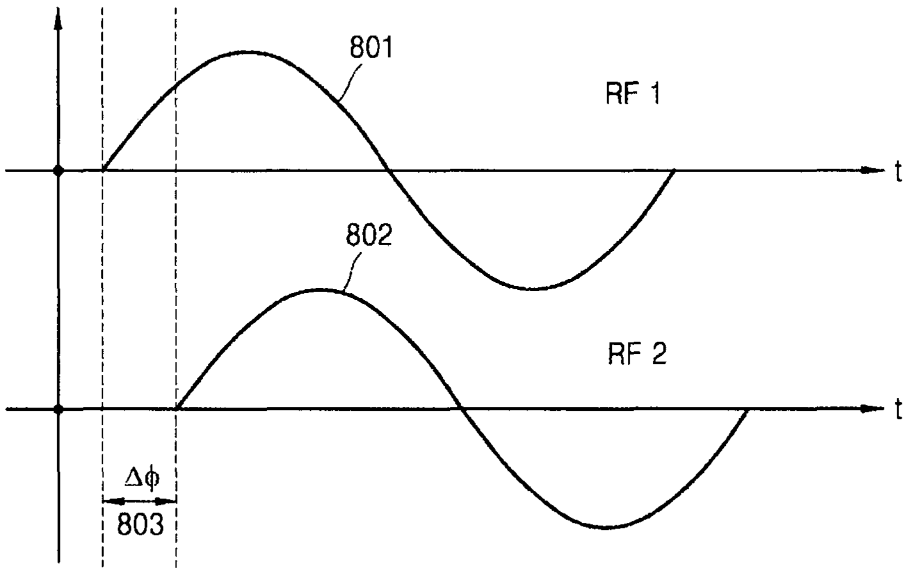
FIG. 8 is a diagram for describing a phase adjustment operation performed by an array antenna according to an embodiment of the disclosure.

FIG. 8 is a diagram for describing a phase adjustment operation performed by an array antenna according to an embodiment of the disclosure.

In detail, FIG. 8 is a diagram for describing a phase or delay value applied to each of the plurality of antenna elements included in the array 205 illustrated in FIGS. 2 and 5.

The processor 220 may perform control such that a plurality of radio signals corresponding to the plurality of antenna elements included in the array 205, respectively, are generated. In addition, the processor 220 may individually control phase values of the plurality of radio signals corresponding to the plurality of antenna elements, respectively. For convenience of description, FIG. 8 illustrates, as an example, only radio signals 801 and 802 respectively applied to the antenna element 501 and the antenna element 502 illustrated in FIG. 5.

Referring to FIG. 8, the X axis of the graph showing the radio signal (e.g., 801) may represent time, and the Y axis may represent the magnitude or gain of the signal.

Referring to FIG. 8, the processor 220 may adjust the phase of the radio signal 801 applied to the antenna element 501, and the phase of the radio signal 802 applied to the antenna element 502 arranged adjacent to the antenna element 501, to be different from each other. In detail, the phase value of the radio signal 802 may be set by applying a set phase delay 803 to the phase of the radio signal 801.

In addition, in order for the beams output from the array 205 to be output in a desired direction, the processor 220 may control the array antenna 210 such that the plurality of radio signals applied to the plurality of antenna elements (e.g., 501 and 502) arranged in the same direction have phase values different from each other by the set phase delay 803. For example, the processor 220 may set the phase values such that the difference between the phase of the radio signal 801 applied to the antenna element 501 and the phase of the radio signal 802 applied to the antenna element 502 is equal to the set phase delay 803. In addition, the processor 220 may set the phase values such that the difference between the phase of the radio signal 802 applied to the antenna element 502 and the phase of a radio signal (not shown) applied to the antenna element 503 is equal to the set phase delay 803. In addition, the processor 220 may set the phase values such that the difference between the phase of a radio signal (not shown) applied to the antenna element 503 and the phase of a radio signal (not shown) applied to the antenna element 504 is equal to the set phase delay 803.

As another example, the processor 220 may control the array antenna 210 such that each of a plurality of radio wave signals applied to a plurality of antenna elements (e.g., 501 and 502) arranged in the same direction has a phase value different from each other by an individually set phase delay (e.g., 803). That is, the phase differences between the plurality of radio signals applied to the plurality of antenna elements (e.g., 501 and 502) arranged in the same direction may have different values.

As described above, the plurality of radio signals applied to the plurality of antenna elements (e.g., 501 and 502) may have a set phase delay (e.g., 803). Each of the plurality of radio signals may be an RF carrier signal. That is, by causing a plurality of RF carrier signals to have a preset phase delay therebetween, a 'phase coherent signal' in which the plurality of RF carrier signals have a stable phase relationship may be generated. As described above, by applying a preset phase difference between the plurality of RF carrier signals, the direction of all beams output from the plurality of antenna elements may be adjusted to a desired direction. As described above, adjusting the direction of all beams to a desired direction may be referred to as 'beam steering'. A beam steering operation will be described in detail below with reference to FIGS. 9 and 10.

FIG. 9 is a diagram for describing a phase adjustment operation performed by an array antenna according to an embodiment of the disclosure.

FIG. 9 shows a table of phase delay values respectively set for a plurality of radio signals applied to a plurality of antenna elements (e.g., 501 and 502) arranged in the same direction such that the direction of all beams is adjusted to a desired direction.

Referring to FIG. 9, the beam angle may correspond to 720 in FIG. 7 described above, and the phase shifter value may correspond to the phase delay 803 between the antenna elements described above with reference to FIG. 8. In addition, the angle values shown in FIG. 9 may be in units of degrees. For example, in a case in which the output direction of a beam, which is the desired transmission direction of a radio wave, is beam angle=−30 degrees, the phase delay value applied to the antenna element (Ant1) 501 may be set to 0 degrees, the phase delay value applied to the antenna element (Ant2) 502 may be set to −90 degrees, the phase delay value applied to the antenna element (Ant3) 503 may be set to −180 degrees, and the phase delay value applied to the antenna element (Ant4) 504 may be set to −270 degrees.

As described above, the array antenna 210 having directivity may precisely control the output direction of the beam to be a desired direction by adjusting the phase delay values applied to the plurality of antenna elements, respectively.

Figure 10:
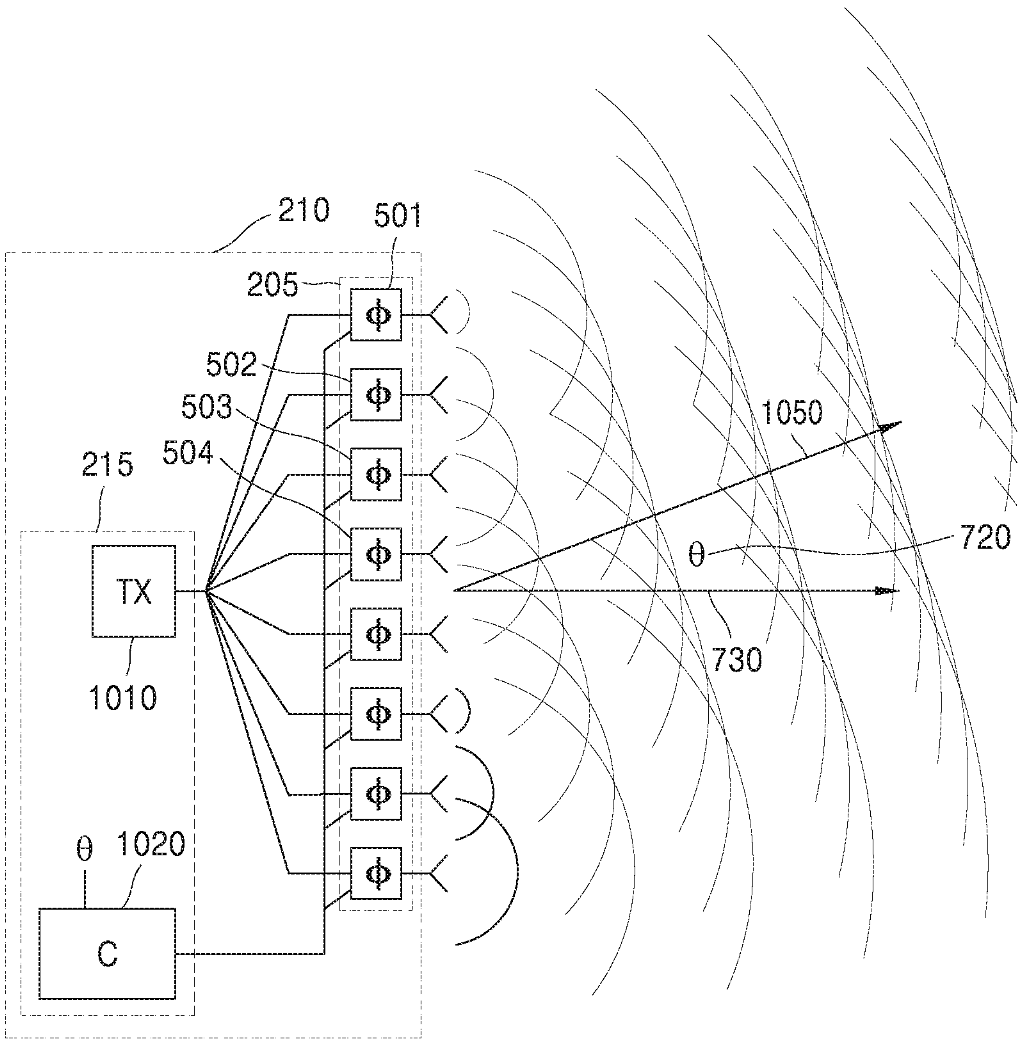
FIG. 10 is a diagram illustrating in detail the configuration of an array antenna according to an embodiment of the disclosure.

FIG. 10 is a diagram illustrating in detail the configuration of an array antenna according to an embodiment of the disclosure.

FIG. 10 illustrates the configuration of the array antenna 210. In addition, in FIG. 10, the same elements as those of FIGS. 2, 5, and 7 are illustrated by using the same reference numerals.

In addition, FIG. 10 illustrates, as an example, only antenna elements arranged in the same array among the plurality of antenna elements included in the array 205. In detail, eight antenna elements included in the array 205 illustrated in FIG. 10 may equally correspond to eight antenna elements included in one row 515 illustrated in FIG. 5.

Referring to FIG. 10, the radio wave transceiver 215 may include a phase control unit 1020 and a transmit beamformer 1010. The transmit beamformer 1010 may generate radio signals to be applied to a plurality of antenna elements, respectively. In detail, the transmit beamformer 1010 may generate a radio signal to have a certain gain and a certain frequency. In addition, the phase control unit 1020 may perform control such that the phases of the radio signals to be respectively applied to the plurality of antenna elements included in the array 205 have certain values. The radio signals generated by the transmit beamformer 1010 are applied to the plurality of antenna elements 501, 502, 503, and 504, respectively, and the phase of each of the plurality of antenna elements 501, 502, 503, and 504 may be controlled by the phase control unit 1020. Accordingly, a radio signal in which the plurality of antenna elements 501, 502, 503, and 504 have preset phase differences therebetween may be output.

In a case in which there is no phase difference between the plurality of radio signals applied to the plurality of antenna elements 501, 502, 503, and 504, respectively, the radiation direction of a main beam may be the straight direction 730 as illustrated in FIG. 10. In addition, in a case in which the plurality of antenna elements 501, 502, 503, and 504 have a phase difference therebetween equal to the preset phase delay 803 as described above with reference to FIGS. 8 and 9, the radiation direction of the main beam may be a direction 1050 tilted from the straight direction 730 by a certain angle as illustrated in FIG. 10. The degree to which the direction 1050 is tilted may vary depending on a phase value applied to radio signals applied to the plurality of antenna elements 501, 502, 503, and 504.

In an embodiment of the disclosure, the processor 220 may perform control such that the shape of a beam pattern formed by beams output from the array antenna 210 is changed, by adjusting at least one of the phase and gain of each of the plurality of radio signals to be output from the plurality of antenna elements included in the array antenna 210, respectively, based on the speed information of the vehicle obtained in operation S410.

Figure 11:
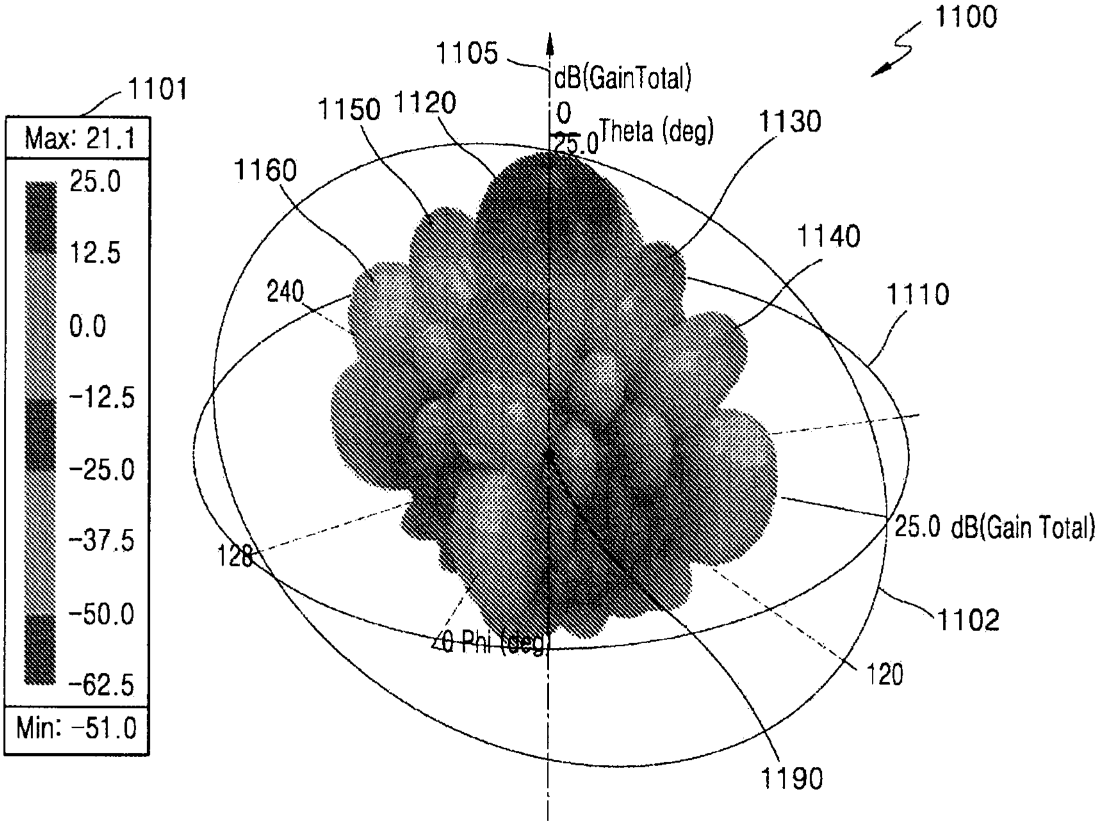
FIG. 11 is a diagram illustrating a beam pattern formed by radio signals output from an array antenna according to an embodiment of the disclosure.

FIG. 11 is a diagram illustrating a beam pattern formed by radio signals output from an array antenna according to an embodiment of the disclosure. In detail, FIG. 11 is a diagram illustrating beams output from the array antenna 210 including 8*8-64 antenna elements.

Referring to FIG. 11, a plane 1110 is on which the array antenna 210 is arranged, and gain values of at least one beam output from the array antenna 210 are in dB units, and are distinguished from each other by color. In detail, a table 1101 shows colors corresponding to gain values, respectively.

FIG. 11 illustrates, as an example, a beam pattern representing a distribution of a plurality of beams output from the array antenna 210, in a case in which a desired beam radiation direction is a direction 1105. At least one beam may be included in each of sub-beam patterns 1120, 1130, 1140, 1150, and 1160 included in a beam pattern 1100.

Figure 12:
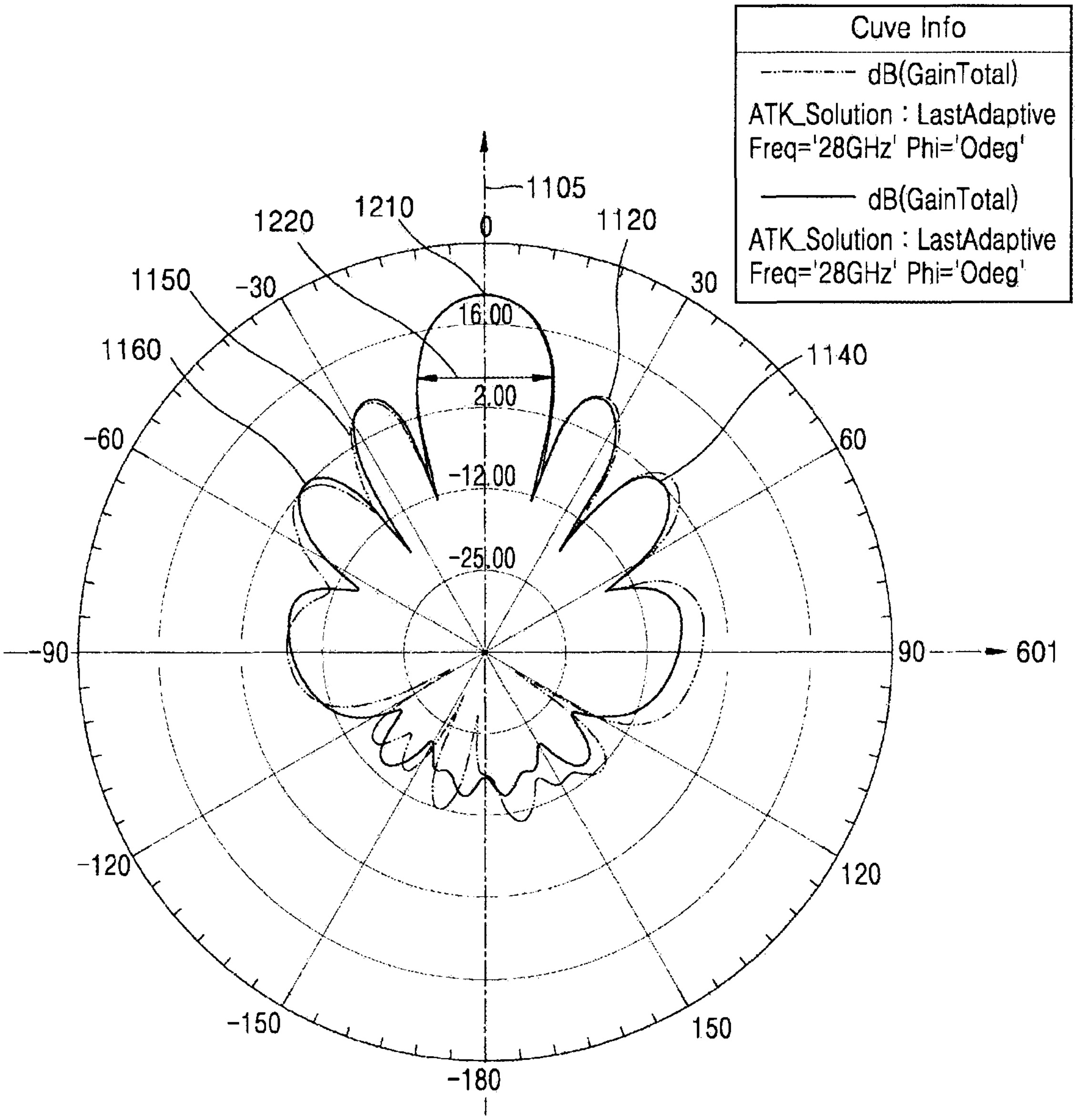
FIG. 12 is another diagram illustrating a beam pattern formed by radio signals output from an array antenna according to an embodiment of the disclosure.

FIG. 12 is another diagram illustrating a beam pattern formed by radio signals output from an array antenna according to an embodiment of the disclosure. In detail, FIG. 12 is a diagram illustrating a vertical cross-section 1102 of the beam pattern 1100 illustrated in FIG. 11.

Referring to FIG. 12, a gain value 1210 of the sub-beam pattern 1120 output in the same direction as the desired beam radiation direction 1105 may be the maximum gain value. In addition, as the gain value 1210 of the sub-beam pattern 1120 increases, a width 1220 of the sub-beam pattern 1120 may decrease. In detail, as the number of output beams is increased by increasing the number of antenna elements included in the array antenna 210, the gain value (e.g., 1210) of the beam pattern formed by the output beams increases and the width of the beam pattern (e.g., 1120) decreases.

In a case of using the array antenna 210 including the plurality of antenna elements to transmit and receive strong radio signals in a desired direction by increasing the directivity of radio waves of an antenna, when the speed of the vehicle rapidly changes, transmission and reception of radio waves may become unstable. In detail, the array antenna 210 may output a beam pattern having a high gain value and a low beam width so as to have directivity. In this case, when the movement speed of the vehicle is high, the output direction of a beam transmitted and received by a counterpart device communicating with the vehicle, and the output direction corresponding to a beam pattern of the array antenna 210 may not match. In this case, transmission and reception of radio waves may be disrupted.

Therefore, in an embodiment of the disclosure, by flexibly adjusting the shape of a beam pattern according to the movement speed of the vehicle, radio signals may always be seamlessly transmitted and received regardless of the movement speed of the vehicle.

Detailed operations for flexibly controlling the vehicle antenna apparatus according to the movement speed of the vehicle will be described in detail below with reference to FIGS. 13 to 23.

Figure 13:
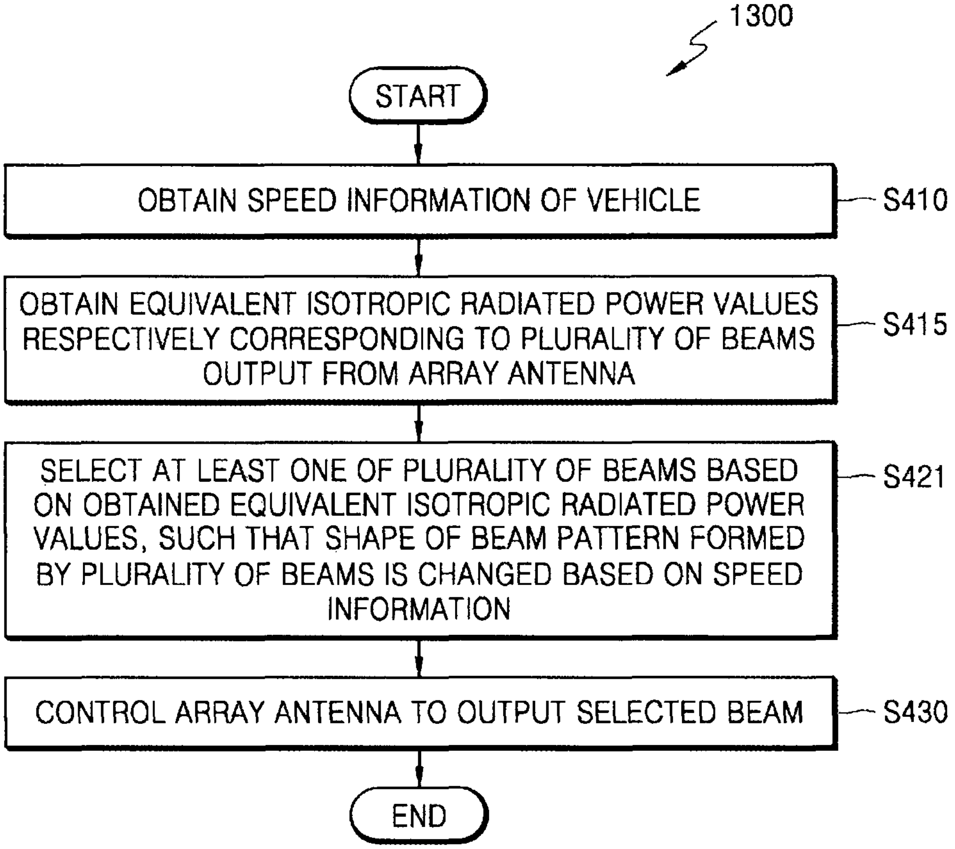
FIG. 13 is another flowchart illustrating a method of controlling an antenna apparatus according to an embodiment of the disclosure.

FIG. 13 is another flowchart illustrating a method of controlling an antenna apparatus according to an embodiment of the disclosure.

Referring to FIG. 13, the same operations as those of FIG. 4 are illustrated by using the same reference numerals. Therefore, in describing a method 1300 of controlling a vehicle antenna apparatus illustrated in FIG. 13, descriptions provided above regarding the method 400 of controlling a vehicle antenna apparatus illustrated in FIG. 4 will be omitted. In addition, the method 1300 of controlling a vehicle antenna apparatus corresponds to a method of controlling the vehicle antenna apparatus 200 or 500 and the vehicle electronic device 300 described above with reference to FIGS. 1 to 12.

The method 1300 of controlling a vehicle antenna apparatus may further include operation S415, in addition to the operations included in the method 400 of controlling a vehicle antenna apparatus. In addition, operation S421 included in the method 1300 of controlling a vehicle antenna apparatus may correspond to operation S420 included in the method 400 of controlling a vehicle antenna apparatus.

Hereinafter, an example will be described in which the method 1300 of controlling a vehicle antenna apparatus is for controlling the vehicle antenna apparatus 500 illustrated in FIG. 5.

In an embodiment of the disclosure, radio waves transmitted and received by the array antenna 210 may be millimeter waves. In detail, in an embodiment of the disclosure, in order to optimize millimeter-wave (mmWAVE) beamforming in response to the speed of the vehicle when the vehicle is moving, the millimeter-wave (mmWAVE) beamforming may be optimized based on first information, which is information about the radiated power of the array antenna 210. Accordingly, transmission and reception of radio waves necessary for communication may be always kept seamlessly according to a change in the speed of the vehicle.

Referring to FIG. 13, the method 1300 of controlling a vehicle antenna apparatus may include obtaining the first information, which is information about the radiated power of an array antenna in operation S415. The first information may be information indicating power radiated in the propagation direction of a beam having the maximum strength among output beams. Information indicating power radiated from an antenna includes equivalent isotropic radiated power (EIRP), effective radiated power (ERP), and the like.

In an embodiment of the disclosure, the first information may be information about EIRP of the array antenna 210. In detail, the first information may be information including EIRP values corresponding to a plurality of beams, which are output respectively from a plurality of antenna elements included in the array antenna 210, and are identified by their output directions to be distinguished from each other.

Hereinafter, for convenience of description, an example will be described and illustrated in which the first information is information about EIRP. In addition, the first information will be described in detail with reference to FIGS. 15 and 16.

EIRP may be expressed as a value obtained by multiplying power supplied to the antenna and the absolute gain of the antenna. That is, EIRP may be expressed as the product of an equipment output power Pt and an antenna gain $G_t$ as follows.

$$\text{EIRP}=\text{Equipment output power}P_t\times\text{Antenna gain}G_t=(\text{Equipment output power})\text{dB}+(\text{Antenna gain})\text{dB}$$

For example, assuming that the output power of the antenna apparatus is 100 mW (20 dBm) and the antenna gain is 20 dBi, EIRP=Equipment output power $P_t$×Antenna gain $G_t$=(Equipment output power) dB+ (Antenna gain) dB=20 dBm+20 dBi=40 dBm.

The antenna gain $G_t$ may be expressed as (Antenna gain+Chain gain+Array gain). In addition, considering the loss generated from the radiated power, EIRP may be expressed as follows.

$$\text{EIRP}=P_{out}+\text{Antenna gain}+\text{Chain gain}+\text{Array gain}+\text{Total Loss}$$

$P_{out}$ may denote the total output power of the apparatus, Antenna gain may denote the gain of the antenna element, Chain gain may denote the gain of Chain, which is an array of antenna elements arranged in the same column, and Array gain may denote the gain of the array 205 included in the array antenna 210. In addition, Total Loss may denote the total loss occurring in the output of the antenna apparatus.

The definition of EIRP is obvious to those of skill in the art of antennas for transmitting and receiving radio waves, and thus, detailed descriptions thereof will be omitted.

FIG. 13 illustrates an example in which the first information is EIRP, and thus, in operation S415, EIRP values respectively corresponding to the plurality of beams output from the array antenna 210 may be obtained in operation S415. In addition, although FIG. 13 illustrates that operation S415 is subsequent to operation S410, operation S415 may be performed before operation S421. Accordingly, operation S415 may be performed simultaneously with or before operation S410. Also, operation S415 may be performed by the processor 220.

The method 1300 of controlling a vehicle antenna apparatus may include selecting at least one of the plurality of beams based on the first information, which is information about the radiated power of the array antenna 210, such that the shape of the beam pattern formed by the plurality of beams output from the array antenna 210 is changed according to the speed information obtained in operation S410 (S421). The operation S421 may be performed by the processor 220.

Subsequently, the method 1300 of controlling a vehicle antenna apparatus may include controlling the array antenna 210 to output the beam selected in operation S421 (S430). The operation S430 may be performed by the processor 220. In detail, the processor 220 may adjust at least one of the phase and signal strength applied to each of the plurality of antenna elements included in the array antenna 210 such that at least one of the plurality of beams, which are identified by their output directions to be distinguished from each other, is selectively output. The above-described phase and signal strength adjustment operation will be described in detail below with reference to FIG. 17.

FIGS. 14 to 23 will be described with reference to the respective components of the vehicle antenna apparatus 500 illustrated in FIG. 5.

Figure 14:
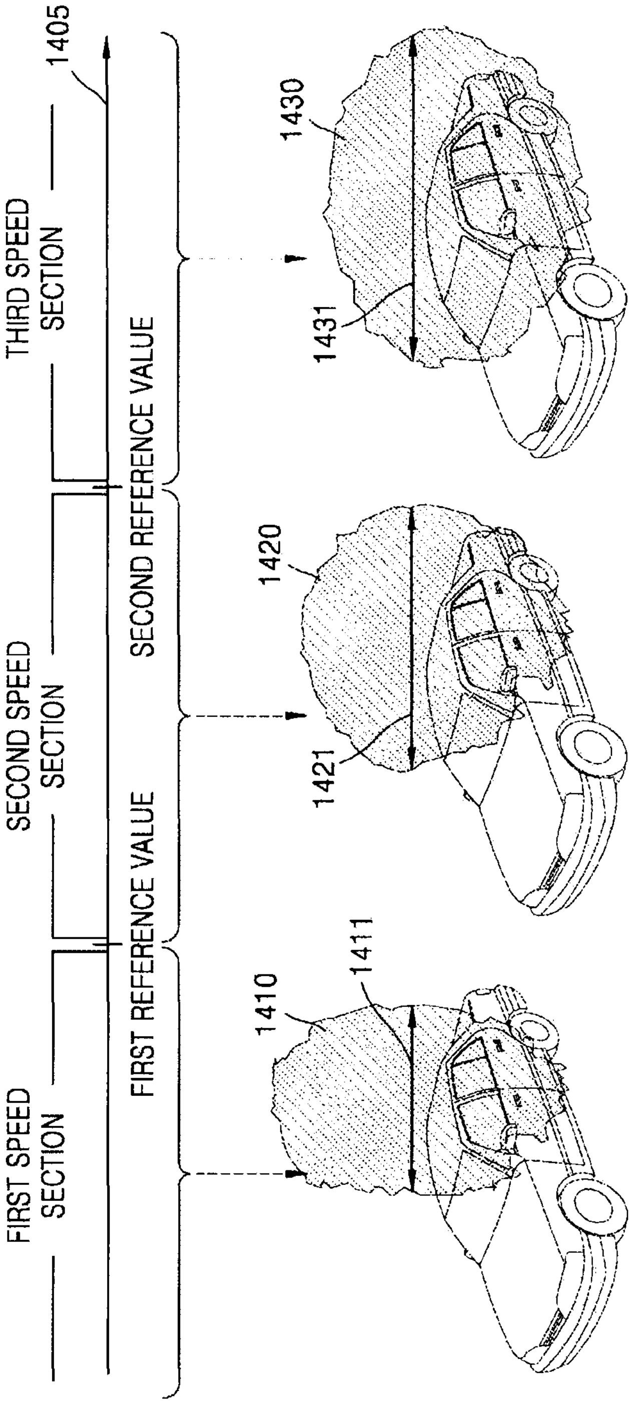
FIG. 14 is a diagram for describing a change in the shape of a beam pattern in an antenna apparatus according to an embodiment of the disclosure.

FIG. 14 is a diagram for describing a change in the shape of a beam pattern in an antenna apparatus according to an embodiment of the disclosure.

In an embodiment of the disclosure, based on the speed information obtained in operation S410, the processor 220 may control the array antenna 210 such that the width of a beam pattern when the speed of the vehicle corresponds to a first speed value is wider than the width of a beam pattern when the speed of the vehicle is equal to a second speed value that is greater than the first speed value. In detail, based on the speed information obtained in operation S410, the processor 220 may select at least one of the plurality of beams and control the array antenna 210 to output the selected beam, such that the width of the beam pattern when the speed of the vehicle corresponds to the first speed value is wider than the width of the beam pattern when the speed of the vehicle is equal to the second speed value that is greater than the first speed value.

In addition, based on the speed information obtained in operation S410, the processor 220 may control the array antenna 210 such that the width of a beam pattern when the speed of the vehicle corresponds to the first speed value is narrower than the width of a beam pattern when the speed of the vehicle is equal to a third speed value that is greater the first speed value.

Referring to FIG. 14, the speed of the vehicle may be classified into a plurality of sections. For example, the speed of the vehicle increases in a first direction 1405, and the speed of the vehicle satisfies 'first speed section<second speed section<third speed section'.

In FIG. 14, the first speed section and the second speed section may be distinguished from each other by a first reference value. The first reference value may be set differently according to the driving environment of the vehicle. For example, the first reference value is a reference value for distinguishing between a case in which the vehicle drives in a downtown and a case in which the vehicle drives in a suburban area (e.g., a national highway). As another example, the first reference value may be a reference value for distinguishing between driving in a high-traffic area and driving on a low-traffic road. Alternatively, the first reference value may be a reference value for distinguishing between driving in a school zone and driving in a non-school zone. For example, the first reference value is set to 30 km/h, 50 km/h, 60 km/h, or the like.

Also, the second speed section and the third speed section may be distinguished from each other by a second reference value. The second reference value may be set differently according to the driving environment of the vehicle, similarly to the first reference value. For example, the first reference value is a reference value for distinguishing between a case in which the vehicle drives on a suburban road (e.g., a national highway) and a case in which the vehicle drives on a highway or a road for the exclusive use of motor vehicles. As another example, the second reference value may be a reference value for distinguishing between a case of driving in an area with almost no traffic and a case of driving on a road with no traffic at all. For example, the second reference value is set to 80 km/h, 100 km/h, 120 km/h, or the like. Hereinafter, an example will be described in which the first reference value is 60 km/h and the second reference value is 100 km/h.

FIG. 14 illustrates, as an example, a beam pattern 1410 that is the distribution of a plurality of beams output from the array antenna 210 when the speed of the vehicle corresponds to the first speed section, a beam pattern 1420 that is the distribution of a plurality of beams output from the array antenna 210 when the speed of the vehicle corresponds to the second speed section, and a beam pattern 1430 that is the distribution of a plurality of beams output from the array antenna 210 when the speed of the vehicle corresponds to the third speed section, in an embodiment of the disclosure.

That is, when the vehicle is driving slowly, the beam pattern may be formed to have a low beam width and a high gain, as in the beam pattern 1410. In addition, when the vehicle is driving fast, the beam width of the beam pattern 1430 may be greater than that of the beam pattern 1410 and the gain value of the beam pattern 1430 may be lower than the gain value of the beam pattern 1410.

In detail, a width 1421 of the beam pattern 1420 may be greater than a width 1411 of the beam pattern 1410, and a width 1431 of the beam pattern 1430 may be greater than the width 1421 of the beam pattern 1420. In addition, as the width of the beam pattern increases, the maximum output gain of beams included in the beam pattern 1410 may decrease. In detail, the maximum output gain of the beam pattern 1410 output in the first speed section may be the highest, and the maximum output gain of the beam pattern 1430 output in the second speed section may be the lowest.

Referring to FIG. 14, by changing the shape of the beam pattern according to a change in the speed of the vehicle, communication may be kept seamless in response to the change in the speed of the vehicle.

Figure 15:
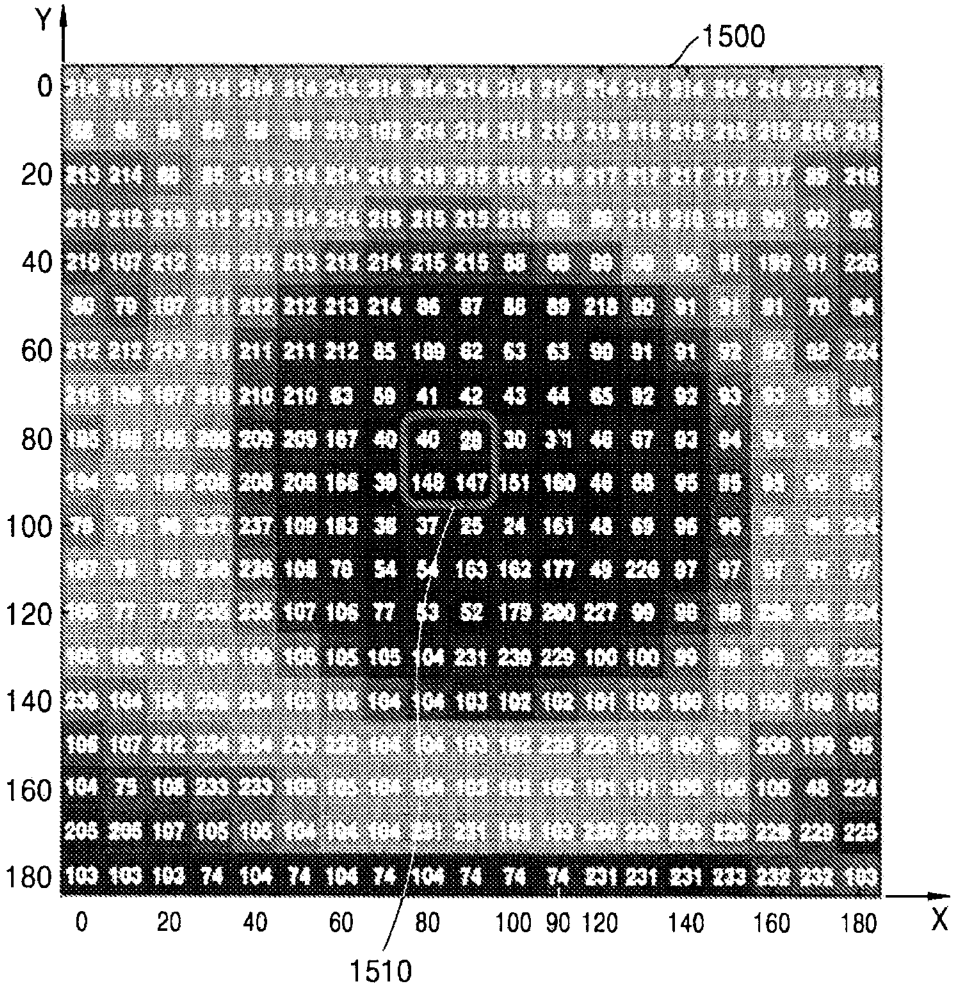
FIG. 15 is a diagram for describing a plurality of beams output from an array antenna according to an embodiment of the disclosure.

FIG. 15 is a diagram for describing a plurality of beams output from an array antenna according to an embodiment of the disclosure.

Each of the plurality of antenna elements included in the array antenna 210 receives a plurality of radio signals and emits radio waves corresponding thereto. The radio waves radiated from each of the plurality of antenna elements may have the shape of a beam output in a certain direction, and accordingly, the plurality of antenna elements may be regarded as outputting a plurality of output beams. The plurality of beams radiated from the array antenna 210 are identified by their output directions to be distinguished from each other, and may be represented by identification numbers that are distinguished according to the output directions. The identification number of the beam may be referred to as a beam identifier (ID).

Referring to FIG. 15, a plurality of beams output from the array antenna 210 are expressed as beam IDs. Hereinafter, a table in which a plurality of beams output from the array antenna 210 are expressed as beam IDs will be referred to as a beam ID map 1500. In detail, the beam ID map 1500 may represent a distribution of the beams viewed from a cross-section perpendicular to a desired transmission/reception direction of a radio wave. For example, the beam ID map 1500 represents a distribution of the beams viewed from the plane 710 of FIG. 7. Thus, adjacent regions in the beam ID map 1500 may be regarded as indicating beams output from the adjacent regions.

In addition, the X axis and the Y axis of the beam ID map 1500 are to define regions in which the beams are distributed, and may be expressed as degree values. For example, a point having a value of 90 degrees on the X axis and a value of 90 degrees on the Y axis is the center point of the radiation region, and may correspond to an origin 1190 illustrated in FIG. 11.

One antenna element may output a plurality of beams corresponding to a plurality of beam IDs, respectively. In addition, when the output directions of at least one beam output from a first antenna element and at least one beam output from a second antenna element are the same as or similar to each other, the at least one beam output from the first antenna element and the at least one beam output from the second antenna element may be represented by the same beam ID value.

In the beam ID map 1500, the expressed color may correspond to gain value of a beam having a certain beam ID as shown in the table 1101 of FIG. 11.

For example, in the beam ID map 1500, approximately 200 beams is output from the array antenna 210 including 8*8=64 antenna elements. The 200 beams may refer to effective beams that may be practically used for transmission and reception of radio waves. However, the number of beam IDs output from an array antenna including a certain number of antenna elements may vary depending on the product specifications of the array antenna. In detail, the product specifications of the array antenna may include the total number of antenna elements, the gain of the array antenna, the frequency band of radio signals to be transmitted and received by the array antenna, and the like. The number of beam IDs output from the array antenna may vary depending on the product specifications described above, and may not be limited. In addition, a beam ID value may be expressed in various ways by using numbers, letters, and the like. FIG. 15 illustrates an example in which the beam IDs are expressed as integers between 0 and 238.

Referring to a region 1510 of FIG. 15, in the region 1510, four distinct beams having beam IDs expressed as values 40, 28, 148, and 147, respectively may exist.

Figure 16:
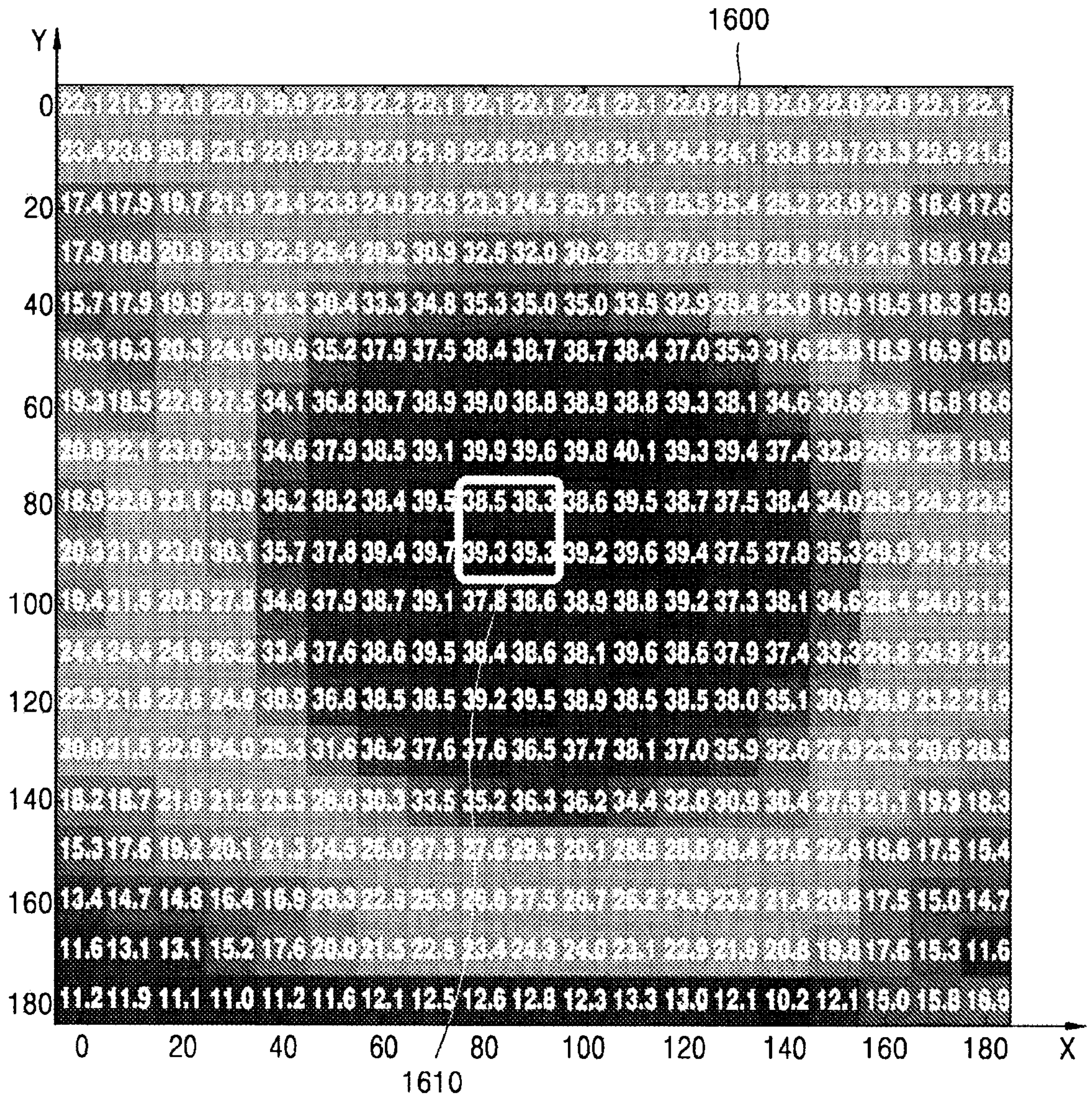
FIG. 16 is a diagram illustrating equivalent isotropic radiated power (EIRP) values of a plurality of beams output from an array antenna according to an embodiment of the disclosure.

FIG. 16 is a diagram illustrating EIRP values of a plurality of beams output from an array antenna according to an embodiment of the disclosure.

FIG. 16 illustrates an EIRP map 1600 indicating EIRP values corresponding to the beam ID map 1500 illustrated in FIG. 15. In detail, the EIRP map 1600 may indicate an EIRP value corresponding to each beam ID, and may be expressed in dB units. A region 1610 equally corresponds to the region 1510 of FIG. 15. That is, the region 1610 represents EIRP values respectively for four distinct beams in which the beam IDs in the region 1510 are expressed as values 40, 28, 148, and 147, respectively. Referring to the region 1510 of FIG. 15 and the region 1610 of FIG. 16, the EIRP of the beam with a beam ID of 40 is 38.5, the EIRP of the beam with a beam ID of 28 is 38.3, the EIRP of the beam with a beam ID of 148 is 39.3, and the EIRP of the beam with a beam ID of 147 is 39.3.

FIG. 17 is a diagram illustrating an example of a beam codebook used to control generation and output of a plurality of beams output from an array antenna according to an embodiment of the disclosure.

A beam codebook may be used to control a certain beam to be output. In detail, the processor 220 may use phase and amplitude values defined in the beam codebook to control the array antenna 210 to output a certain beam.

The beam codebook may be information defining which phase value and amplitude value are set for a radio signal applied to a certain antenna element in order to output a certain beam. An antenna element corresponding to a certain beam, and phase and amplitude values corresponding to the antenna element, which are defined in the beam codebook, may be experimentally optimized and set. For example, in order to output a beam in a particular direction, the phase and amplitude values of radio signals applied to each of certain antenna elements are optimized through experiments and experiences.

Referring to a table 1700 of FIG. 17, Region 1710 indicates certain regions included in the beam ID map 1500. Also, in a case in which a plurality of beams are grouped, Region 1710 may indicate a region corresponding to one group. Region A may refer to the region 1510 illustrated in FIG. 15. That is, Beam IDs 1720 included in the region 1510, which is Region A, may be 40, 28, 148, and 147. Ant Feed 1730 indicates antenna elements that output a beam corresponding to the corresponding beam ID, Amplitude 1740 defines an amplitude value of a radio signal applied to the corresponding antenna element, and Phase 1750 defines a phase value of a radio signal applied to the corresponding antenna element.

For example, antenna elements used to generate a beam having a beam ID value of 40 included in the region 1510, which is Region A, are Antenna elements 1, 2, 3, and 4, and amplitude values of radio signals corresponding to Antenna elements 1, 2, 3, and 4 may have values of a25, a26, a27, and a28, respectively. In addition, the phase values of the radio signals corresponding to Antenna elements 1, 2, 3, and 4 may have values of 25, 26, 27, and 28, respectively.

As in the above example, the processor 220 may control the array antenna 210 to output a certain beam by using a beam codebook that defines an antenna element optimized for outputting the beam and phase and amplitude values corresponding thereto.

Referring back to FIGS. 13 to 17, as described above with reference to FIG. 14, the processor 220 may select at least one of the plurality of beams based on the first information, which is information about the radiated power of the array antenna 210, for example, EIRP values, and control the array antenna 210 to output the selected beam, such that the shape of the beam pattern formed by the plurality of beams output from the plurality of antenna elements is changed according to the speed information.

In detail, the processor 220 may increase the number of beams selected from all beams identified by their output directions (e.g., represented by different beam IDs according to the output directions) as the speed of the vehicle increases.

Also, in the selecting of the beam in operation S421, the processor 220 may group the plurality of beams into groups corresponding to adjacent regions, and select at least one of at least one beam included in a group. In detail, the processor 220 may group the plurality of beams into a plurality of groups, select at least one beam from each of the plurality of groups based on EIRP values of the array antenna 210, and control the array antenna 210 to output the selected beam.

In detail, the processor 220 may select one beam having a maximum value of the EIRP from each of the plurality of groups, and control the array antenna 210 to output the selected beam.

Grouping and beam selection for each group will be described in detail below with reference to FIGS. 16 to 23.

In an embodiment of the disclosure, in the section in which the speed of the vehicle is the slowest (e.g., the first speed section of FIG. 14), the speed of the vehicle is low, and thus, the possibility of missing transmission and reception of a radio signal due to the movement of the vehicle is reduced. Accordingly, the processor 220 may perform control such that all of the plurality of beams output from the plurality of antenna elements are output to increase the directivity and output a beam having the maximum output power. That is, the processor 220 may select all of the plurality of beams output from the plurality of antenna elements, and control the array antenna 210 to output all of the selected beams based on the beam codebook.

For example, in the section in which the speed of the vehicle is the slowest (e.g., the first speed section of FIG. 14), the processor 220 performs control such that all beams included in the beam ID map 1500 illustrated in FIG. 15 are selected and output. In this case, the above-described groups may correspond to individual beams, respectively.

Figure 18:
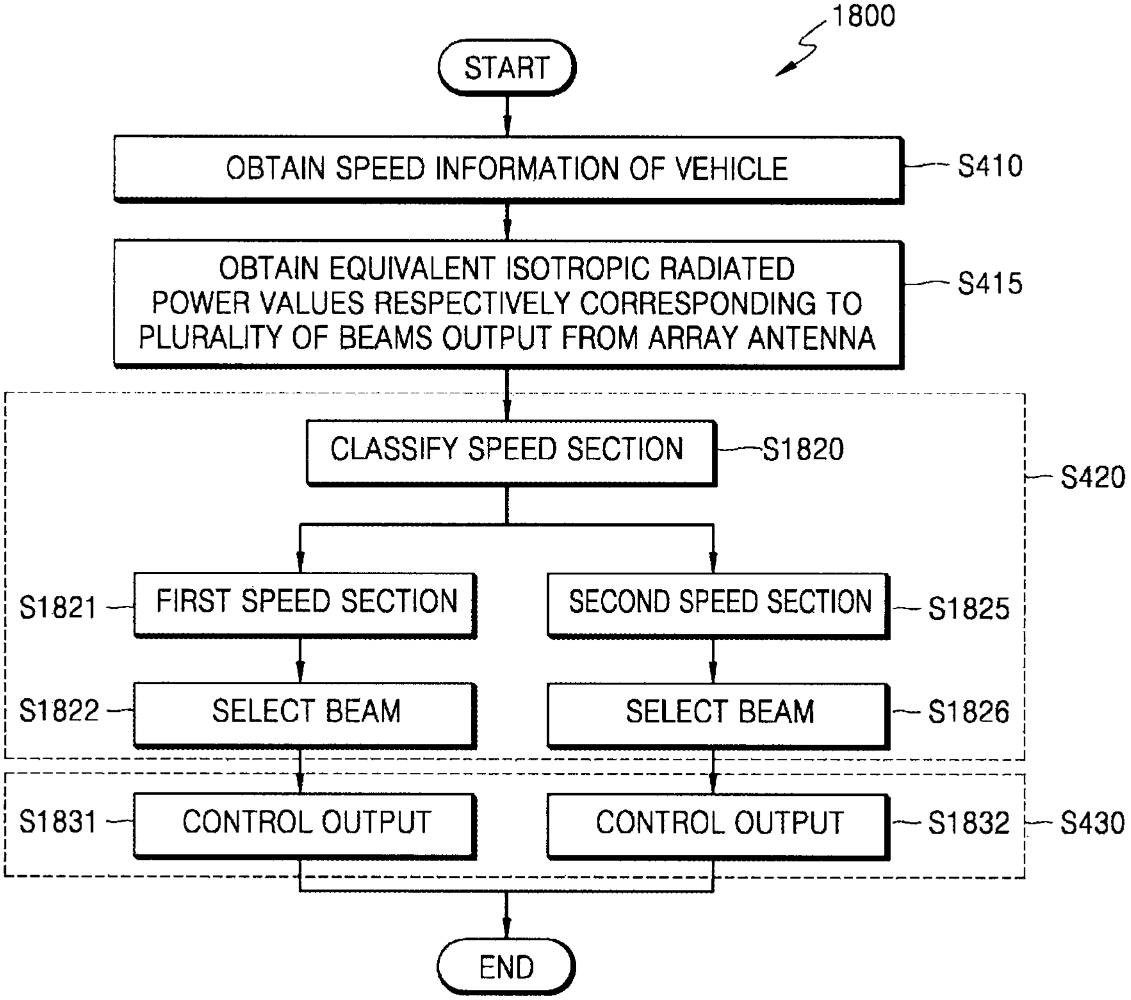
FIG. 18 is another flowchart illustrating a method of controlling an antenna apparatus according to an embodiment of the disclosure.

FIG. 18 is another flowchart illustrating a method of controlling an antenna apparatus according to an embodiment of the disclosure.

In FIG. 18, the same operations as those of FIGS. 4 and 13 are illustrated by using the same reference numerals. Therefore, in describing a method 1800 of controlling a vehicle antenna apparatus illustrated in FIG. 18, descriptions provided above regarding the methods 400 and 1300 of controlling a vehicle antenna apparatus illustrated in FIGS. 4 and 13 will be omitted. In addition, the method 1800 of controlling a vehicle antenna apparatus corresponds to a method of controlling the vehicle antenna apparatus 200 or 500 and the vehicle electronic device 300 described above with reference to FIGS. 1 to 17.

Referring to FIG. 18, operation S420 may include classifying a speed section of the vehicle into a plurality of speed sections in operation S1820, selecting a beam according to a corresponding speed section of the plurality of speed sections in operations S1822 and S1826, and controlling the selected beam to be output in operations S1831 and S1832. FIG. 18 illustrates an example in which the speed section is classified into a first speed section and a second speed section having values greater than those of the first speed section.

Hereinafter, an example will be described in which the first speed section of operation S1821 and the second speed section of operation S1825 of FIG. 18 correspond to the first speed section and the second speed section illustrated in FIG. 14, respectively.

In detail, in the selecting of the beam according to the corresponding speed section in operations S1822 and S1826, one beam may be selected from groups having different sizes according to the corresponding speed section. The groups having different sizes may mean that the numbers of beams included in beam groups are different from each other.

In detail, when the speed of the vehicle is within the first speed section, the processor 220 may group the plurality of beams such that n beams are included in each of the plurality of groups. In addition, when the speed of the vehicle is within the second speed section, the processor 220 may group the plurality of beams into a plurality of groups such that m beams greater than n are included in each of the plurality of groups. In addition, based on the first information, the processor 220 may select one beam from the groups obtained by differently grouping according to the speed sections.

The selecting of the beam according to the corresponding speed section in operations S1822 and S1826 will be described in detail below with reference to FIGS. 19 to 20.

Figure 19:
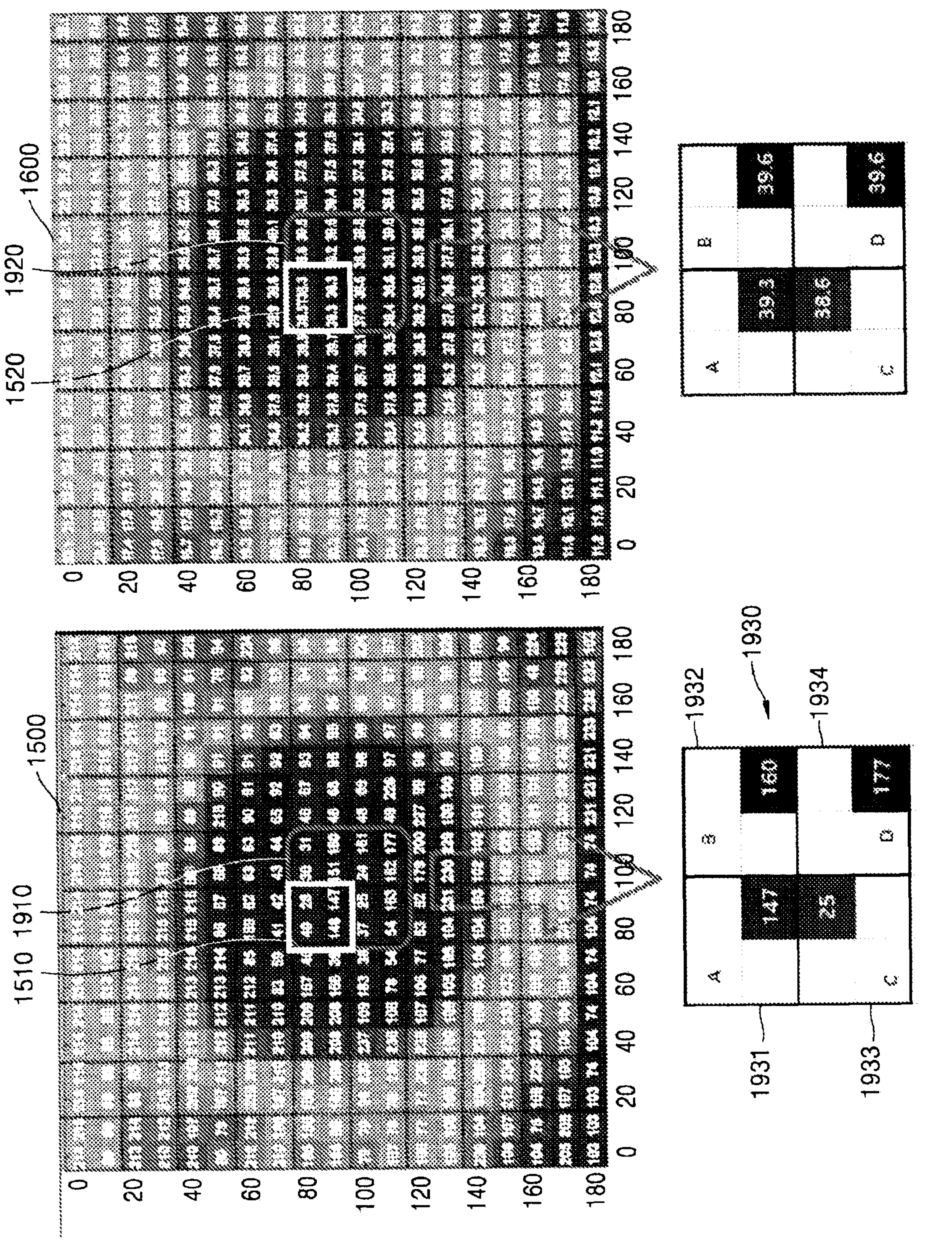
FIG. 19 is a diagram for describing beam selection and output control operations according to an embodiment of the disclosure.

FIG. 19 is a diagram for describing beam selection and output control operations according to an embodiment of the disclosure.

In FIG. 18, the same elements as those of FIGS. 15 and 16 are illustrated by using the same reference numerals.

FIG. 20 is another diagram for describing beam selection and output control operations according to an embodiment of the disclosure.

Referring to FIG. 20, the same elements as those of FIG. 17 are illustrated by using the same reference numerals.

Referring to FIG. 19, a region 1910 that is a partial region included in the beam ID map 1500 may include 16 beams, including the region 1510 described above with reference to FIG. 15. In an enlarged view of the region 1910, an enlarged region 1930 may include 4 beam groups each including 4 beams. In addition, referring to the enlarged region 1930, the four groups are illustrated as A, B, C, and D, respectively.

Referring to the enlarged region 1930, IDs of beams included in Group A 1931 are 40, 28, 148, and 147, respectively, and IDs of beams included in Group B 1932 are 30, 31, 151, and 160, respectively, IDs of beams included in Group C 1933 are 37, 25, 54, and 163, respectively, and IDs of beams included in Group D 1934 are 24, 161, 162, and 177, respectively.

In addition, a region 1920 that is a partial region included in the EIRP map 1600 corresponds to the region 1910, and represents EIRP values of the respective beams included in the region 1910.

For example, in a case in which the plurality of beams are grouped into groups each including 4 beams, and thus, the region 1910 includes 4 beam groups, the processor 220 selects one beam having the maximum EIRP value among the beams included in each group.

For example, when the speed of the vehicle is classified as the first speed section in operation S1821, the processor 220 groups the plurality of beams into groups each including 1 beams, and select a beam having the maximum EIRP value from each group in operation S1822. Then, the processor 220 may control the array antenna 210 to output the beam selected in operation S1822 (S1831). For example, 1 may be 1. For example, as described above with reference to FIGS. 16 and 17, the processor 220 selects all of the plurality of beams output from the plurality of antenna elements, and control the array antenna 210 to output all of the selected beams based on the beam codebook.

In addition, when the speed of the vehicle is classified as the second speed section in operation S1825, the processor 220 may group the plurality of beams into groups each including m beams greater than 1, and select a beam having the maximum EIRP value from each group in operation S1826. Then, the processor 220 may control the array antenna 210 to output the beam selected in operation S1826 (S1832).

For example, m may be 4. For example, as described above with reference to FIG. 19, the processor 220 selects one beam having the maximum EIRP value from among the four beams, and control the array antenna 210 to output the selected beam based on the beam codebook.

In detail, referring to FIG. 19, a beam having the maximum EIRP in Group A 1931 is a beam corresponding to a beam ID of 147, and the beam has a value of EIRP=39.3. Accordingly, the processor 220 may select the beam ID 147 having the maximum EIRP from Group A 1931, and perform control such that the selected beam is output. Referring to FIG. 20, in order to output the beam corresponding to beam ID=147, which is a beam having the maximum EIRP in Region A corresponding to Group A, the processor 220 may perform control such that the beam corresponding to beam ID=147 is output, by using data 2010 corresponding to beam ID=147 in a beam codebook 2000.

In addition, referring to FIG. 19, a beam having the maximum EIRP in Group B 1932 is a beam corresponding to a beam ID of 160, and the beam has a value of EIRP=39.6. Accordingly, the processor 220 may select the beam ID 160 having the maximum EIRP from Group B 1932, and perform control such that the selected beam is output. Referring to FIG. 20, in order to output the beam corresponding to beam ID=147, which is a beam having the maximum EIRP in Region B corresponding to Group B, the processor 220 may perform control such that the beam corresponding to beam ID=160 is output, by using data 2020 corresponding to beam ID=147 in the beam codebook 2000.

In addition, referring to FIG. 19, a beam having the maximum EIRP in Group C 1933 is a beam corresponding to a beam ID of 25, and the beam has a value of EIRP=38.6. Accordingly, the processor 220 may select the beam ID 25 having the maximum EIRP from Group C 1933, and perform control such that the selected beam is output. Referring to FIG. 20, in order to output the beam corresponding to beam ID=25, which is a beam having the maximum EIRP in Region C corresponding to Group C, the processor 220 may perform control such that the beam corresponding to beam ID=25 is output, by using data 2030 corresponding to beam ID=25 in the beam codebook 2000.

In addition, referring to FIG. 19, a beam having the maximum EIRP in Group D 1934 is a beam corresponding to a beam ID of 177, and the beam has a value of EIRP=39.6. Accordingly, the processor 220 may select the beam ID 177 having the maximum EIRP from Group D 1934, and perform control such that the selected beam is output. Referring to FIG. 20, in order to output the beam corresponding to beam ID=177, which is a beam having the maximum EIRP in Region D corresponding to Group D, the processor 220 may perform control such that the beam corresponding to beam ID=177 is output, by using data 2040 corresponding to beam ID=147 in the beam codebook 2000.

In addition, in an embodiment of the disclosure, the processor 220 may perform control such that beams not selected in operations S1822 and S1826 are not output. 'Disable' in the beam codebook 2000 of FIG. 20 may mean that the amplitude and phase values of the radio signal corresponding to the corresponding beam in the pieces of data set in the beam codebook 2000 are not used such that unselected beams are not output.

Figure 21:
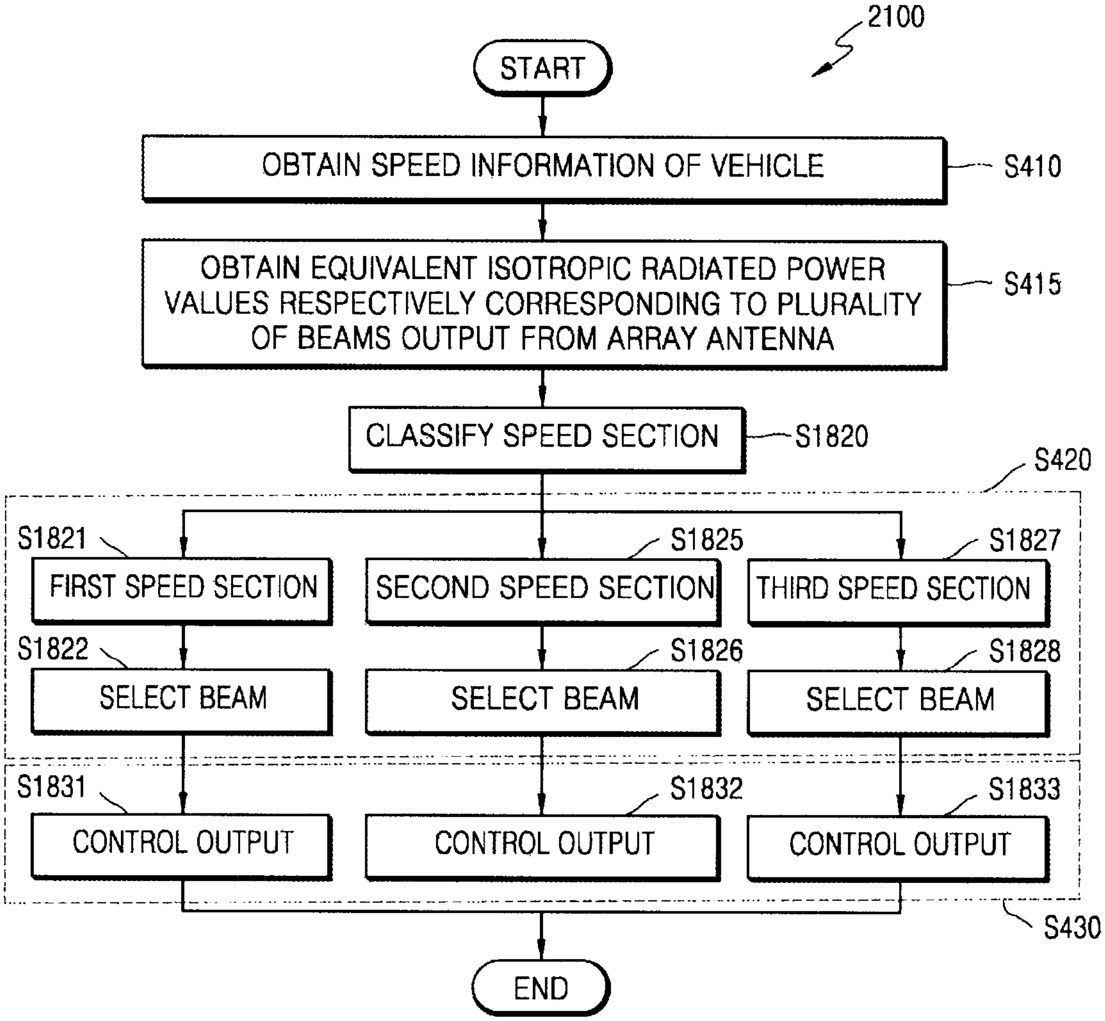
FIG. 21 is another flowchart illustrating a method of controlling an antenna apparatus according to an embodiment of the disclosure.

FIG. 21 is another flowchart illustrating a method of controlling an antenna apparatus according to an embodiment of the disclosure.

In FIG. 21, the same operations as those of FIG. 18 are illustrated by using the same reference numerals. Therefore, in describing a method 2100 of controlling a vehicle antenna apparatus illustrated in FIG. 21, descriptions provided above regarding the method 1800 of controlling a vehicle antenna apparatus illustrated in FIG. 18 will be omitted. In addition, the method 2100 of controlling a vehicle antenna apparatus corresponds to a method of controlling the vehicle antenna apparatus 200 or 500 and the vehicle electronic device 300 described above with reference to FIGS. 1 to 20. FIG. 21 illustrates an example in which, in the classifying into the plurality of speed sections in operation S1820, the plurality of speed sections include three speed sections.

Referring to FIG. 21, operation S420 may include classifying the speed section of the vehicle into a first speed section, a second speed section including values greater than those of the first speed section, and a third speed section including values greater than those of the second speed section in operation S1820, and selecting a beam according to a corresponding speed section in operations S1822, S1826, and S1828, and controlling the selected beam to be output in operations S1831, S1832, and S1833.

In addition to the description provided above with reference to FIG. 18, when the speed of the vehicle corresponds to the third speed section in operation S1827, the processor 220 may group the plurality of beams into a plurality of groups such that n beams greater than m are included in each of the plurality of groups. In addition, based on the first information, the processor 220 may select one beam from the groups obtained by differently grouping according to the speed sections.

Here, l, m, and n may be optimized and set according to at least one of the movement speed of the vehicle, the product specifications of the array antenna 210, and the shape of the beam pattern corresponding to the movement speed of the vehicle. In addition, l, m, and n may be optimized and set experimentally or through training using AI technology.

An example will be described below in which an antenna apparatus including 64 antenna elements is set with 1=1, m=4, and n=16.

In addition, an operation of grouping and selecting beams in the third speed section will be described in detail below with reference to FIGS. 22 and 23.

Figure 22:
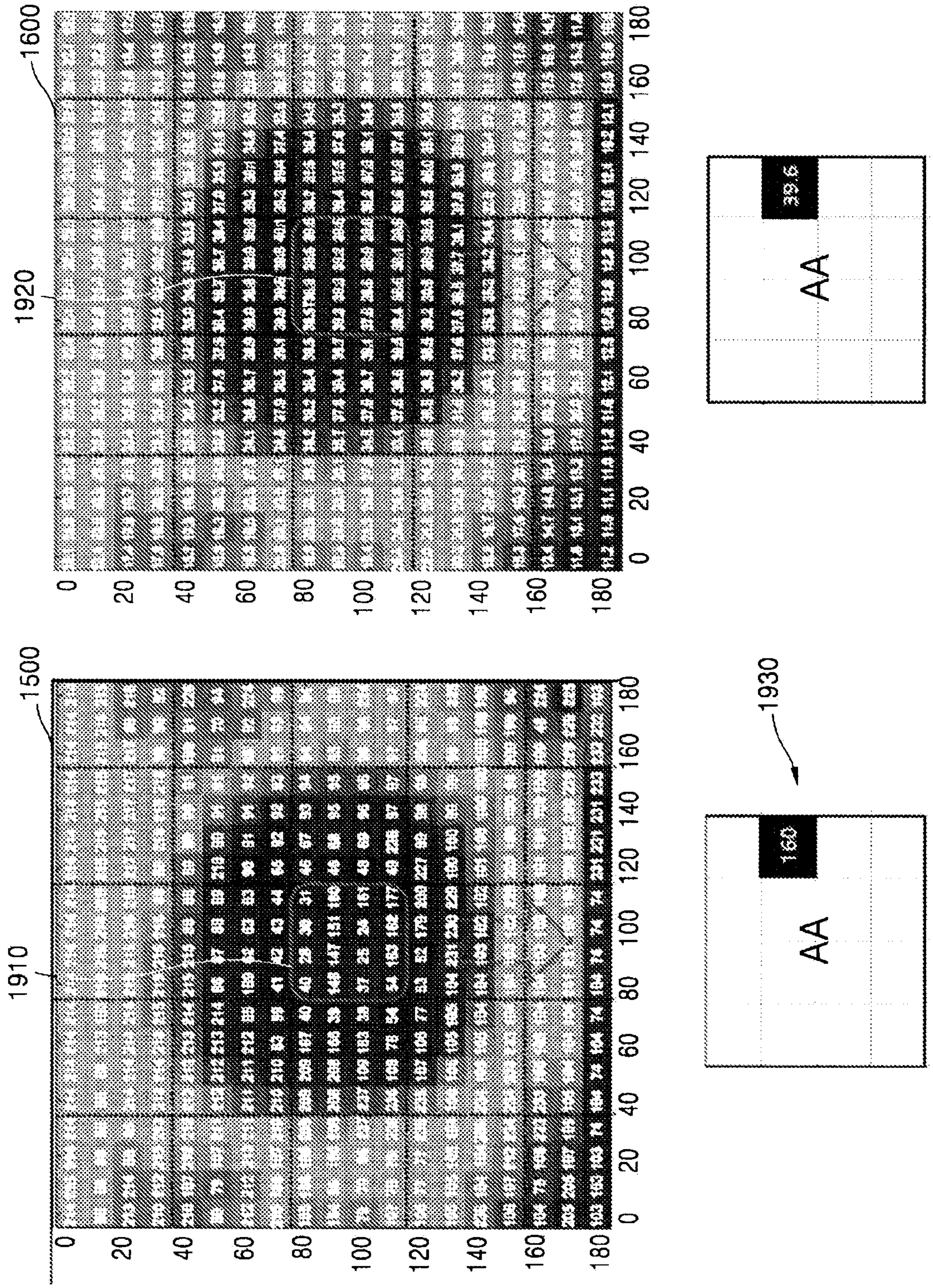
FIG. 22 is another diagram for describing beam selection and output control operations according to an embodiment of the disclosure.

FIG. 22 is another diagram for describing beam selection and output control operations according to an embodiment of the disclosure.

In FIG. 22, the same elements as those of FIG. 19 are illustrated by using the same reference numerals.

FIG. 23 is another diagram for describing beam selection and output control operations according to an embodiment of the disclosure. In FIG. 23, the same elements as those of FIG. 17 are illustrated by using the same reference numerals.

Referring to FIG. 22, the region 1910 that is a partial region included in the beam ID map 1500 may include 16 beams, including the region 1510 described above with reference to FIG. 15. In an enlarged view of the region 1910, the enlarged region 1930 may include one beam group including 16 beams. In addition, referring to the enlarged region 1930, the group is expressed as AA.

For example, when the speed of the vehicle corresponds to the third speed section in operation S1827, and the plurality of beams are grouped into groups each including 16 beams, and thus the region 1910 includes one beam group, which is Group AA, the processor 220 selects one beam having the maximum EIRP value among the beams included in Group AA in operation S1828. Then, the processor 220 may control the array antenna 210 to output the beam selected in operation S1828 in operation S1833.

Referring to the enlarged region 1930 of FIG. 22, a beam having the maximum EIRP among the beams included in Group AA corresponds to a beam ID of 160, and the beam has a value of EIRP=39.6. Accordingly, the processor 220 may select the beam ID 160 having the maximum EIRP from Group AA, and perform control such that the selected beam is output.

Referring to FIG. 23, in order to output the beam corresponding to beam ID=160, which is a beam having the maximum EIRP in Group AA, the processor 220 may perform control such that the beam corresponding to beam ID=160 is output, by using data 2310 corresponding to beam ID=147 in a beam codebook 2300.

In addition, in an embodiment of the disclosure, the processor 220 may perform control such that beams not selected in operation S1828 are not output. 'Disable' in the beam codebook 2300 of FIG. 23 may mean that the amplitude and phase values of the radio signal corresponding to the corresponding beam in the pieces of data set in the beam codebook 2300 are not used such that unselected beams are not output.

Figure 24:
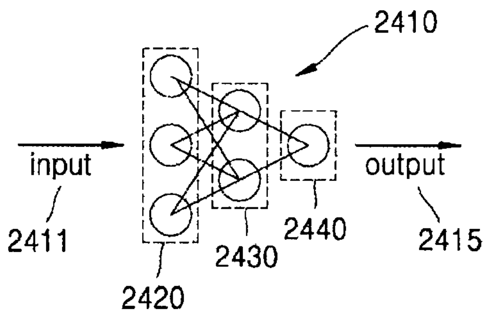
FIG. 24 is a diagram illustrating a neural network for performing at least one operation included in a method of controlling a vehicle antenna apparatus, according to an embodiment of the disclosure.

FIG. 24 is a diagram illustrating a neural network for performing at least one operation included in a method of controlling a vehicle antenna apparatus according to an embodiment of the disclosure.

In an embodiment of the disclosure, at least one of the operations performed by the processor 220 may be performed by using AI technology. The at least one operation performed by using AI technology will be described in detail below with reference to FIG. 24.

In detail, at least one of operations, performed by the processor 220, of i) obtaining the first information, specifically calculating EIRP, ii) classifying into the plurality of speed sections described above with reference to FIG. 18 and/or setting a reference value for distinguishing between the plurality of sections, iii) predicting a beam pattern corresponding to the speed of the vehicle, iv) determining the number of beams included in a beam group corresponding to the speed of the vehicle, and v) obtaining a beam codebook may be performed by using AI technology for performing computations through a neural network.

The AI technology is for obtaining an intended result by performing processing, such as analysis and/or classification, on input data by performing computations through a neural network.

The AI technology may be implemented by using algorithms. An algorithm or a set of algorithms for implementing AI technology are called a neural network. The neural network may receive an input of input data, perform computations for analysis and classification, and output resulting data. As such, in order for the neural network to accurately output resulting data corresponding to input data, it is necessary to train the neural network. Here, 'training' may refer to training a neural network such that the neural network may discover or learn on its own a method of analyzing various pieces of data input to the neural network, a method of classifying the input pieces of data, and/or a method of extracting, from the input pieces of data, features necessary for generating resulting data. In detail, through a training process, the neural network may be trained based on training data (e.g., a plurality of different images) so as to optimize and set weight values in the neural network. Then, the neural network having the optimized weight values may output an intended result by learning input data by itself.

In detail, neural networks that include a plurality of hidden layers for performing computations, that is, the depth of which for performing computations is high, may be classified as deep neural networks. Examples of neural networks include deep neural networks (DNNs), convolutional neural networks (CNNs), recurrent neural networks (RNNs), restricted Boltzmann machines (RBMs), deep belief networks (DBNs), bidirectional recurrent DNNs (BRDNNs), and deep Q-networks, but are not limited thereto. In addition, the neural networks may be subdivided. For example, CNNs are subdivided into deep CNN (DCNN), capsule neural networks (CapsNets) (not shown), and the like.

In an embodiment of the disclosure, an 'AI model' may refer to a neural network including at least one layer operating to receive input data and output an intended result. The 'AI model' may also refer to an algorithm or a set of a plurality of algorithms for outputting an intended result by performing computations through a neural network, a processor for executing the algorithm or the set of algorithms, software for executing the algorithm or the set of algorithms, or hardware for executing the algorithm or the set of algorithms.

Referring to FIG. 24, a neural network 2410 may be trained by receiving an input of training data. Then, the trained neural network 2410 may receive input data 2411 through an input end 2420, may perform computations for analyzing the input data 2411 and outputting output data 2415, which is an intended result, through an output end 2440. The computations through the neural network may be performed through a hidden layer 2430. Although FIG. 1 illustrated the hidden layer 2430 simplified to be one layer for convenience of description, a plurality of hidden layers 2430 may be provided.

In detail, in an embodiment of the disclosure, the neural network 2410 may learn the shapes of beam patterns such that transmission and reception of radio signals are kept seamless in response to the speed of the vehicle. In detail, the neural network 2410 may learn a criterion regarding which shape of the beam pattern maintains a seamless condition for each speed of the vehicle, and learn the shape of a beam pattern corresponding to each speed of the vehicle. Also, the neural network 2410 may learn a beam pattern corresponding to an output beam. Alternatively, the neural network 2410 may learn a criterion for grouping beams into beam groups in order to output a desired beam pattern shape according to the movement speed of the vehicle. Alternatively, the neural network 2410 may learn a criterion regarding which beam to select from among a beam group in order to output a desired beam pattern shape.

The trained neural network 2410 may receive an input of the speed of the vehicle and the plurality of beams output from the plurality of antenna elements included in the array antenna 210, select at least one of the plurality of beams, and output a result of the selecting.

Alternatively, the trained neural network 2410 may receive an input of the speed of the vehicle and the plurality of beams output from the plurality of antenna elements included in the array antenna 210, select at least one of the plurality of beams, and calculate information (e.g., information about a phase and amplitude necessary for outputting the selected beam, in a beam codebook) for controlling the selected beams to be output. Then, the trained neural network 2410 may output the calculated values.

In an embodiment of the disclosure, the neural network described above may be implemented within a processor (e.g., 220 of FIG. 2).

Alternatively, the neural network may be separated from the vehicle antenna apparatus (e.g., 200 or 500), and may be implemented within a separate electronic device (not shown) located in the vehicle, or a processor (not shown).

In addition, the above-described computations through the neural network may be performed by a server (not shown) capable of communicating with the vehicle antenna apparatus (e.g., 200 or 500) according to an embodiment of the disclosure through a wireless communication network. Communication between the vehicle antenna apparatus (e.g., 200 or 500) and the server (not shown) will be described in detail below with reference to FIGS. 25 and 26.

Figure 25:
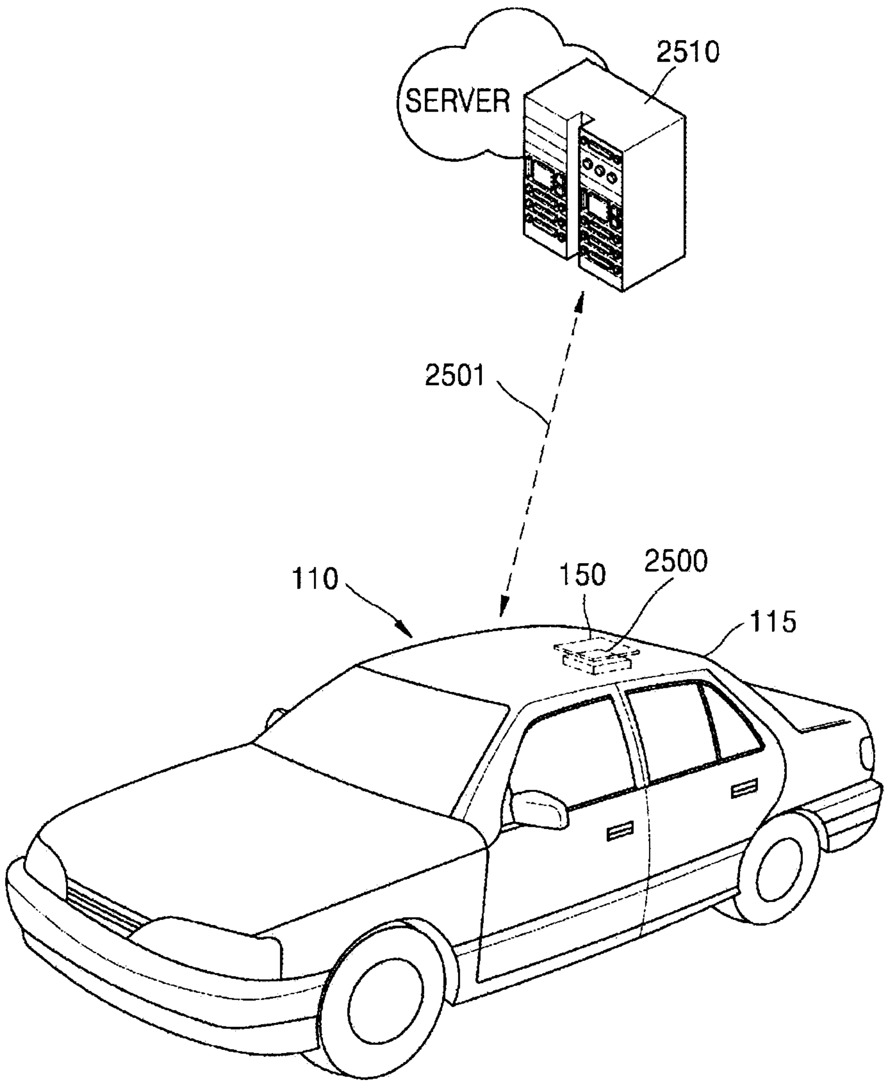
FIG. 25 is a diagram illustrating communication between a vehicle electronic device and a server, according to an embodiment of the disclosure.

FIG. 25 is a diagram illustrating communication between a vehicle electronic device and a server according to an embodiment of the disclosure. A vehicle antenna apparatus 2500 illustrated in FIG. 25 may correspond to the vehicle antenna apparatus 200 or 500 or the vehicle electronic device 300 according to an embodiment of the disclosure described above with reference to FIGS. 1 to 24. Therefore, descriptions provided above will be omitted.

Hereinafter, for convenience of description, information about the beams selected in operation S420 described above with reference to FIGS. 4, 13, and 18 will be referred to as 'beam selection information'.

Referring to FIG. 25, the beam selection information may be calculated by a server 2510 and then transmitted to the vehicle antenna apparatus 2500 located in the vehicle 110. In addition, the server 2510 may include a server, a server system, a server-based device, and the like that transmit and receive, through a communication network, data to and from an electronic device, for example, the vehicle antenna apparatus 2500, and process data.

In addition, the vehicle antenna apparatus 2500 may be a separate electronic device located in the vehicle 110 and capable of performing wired/wireless communication with another vehicle antenna apparatus (e.g., 200 or 500). In a case in which the vehicle antenna apparatus 2500 is separated from another vehicle antenna apparatus (not shown in FIG. 25) (e.g., 200 or 500), the vehicle antenna apparatus 2500 may transmit, to the other vehicle antenna apparatus (not shown in FIG. 25) (e.g., 200 or 500), beam selection information obtained through a neural network.

In an embodiment of the disclosure, the server 2510 may include the neural network 2410 described above with reference to FIG. 24. In detail, the neural network 2410 included in the server 2510 may be a trained neural network, and may receive input data and perform computations through the neural network 2410 to output an intended result.

The server 2510 may transmit information obtained by performing computations through the neural network, for example, at least one of beam selection information and a beam codebook, to the vehicle antenna apparatus 2500 through a wireless communication network 2501.

Then, the vehicle antenna apparatus (e.g., 200 or 500) according to an embodiment of the disclosure may select at least one of a plurality of beams based on the beam selection information transmitted from the server 2510, and control the array antenna 210 to output the selected beam.

Alternatively, the server 2510 may generate a beam codebook corresponding to the speed of the vehicle by performing computations through the neural network. Then, the server 2510 may transmit the obtained beam codebook to the vehicle antenna apparatus 2500. Then, the vehicle antenna apparatus (e.g., 200 or 500) according to an embodiment of the disclosure may control the array antenna 210 to output the beam selected in operation S420, based on the beam codebook received from the server 2510.

Figure 26:
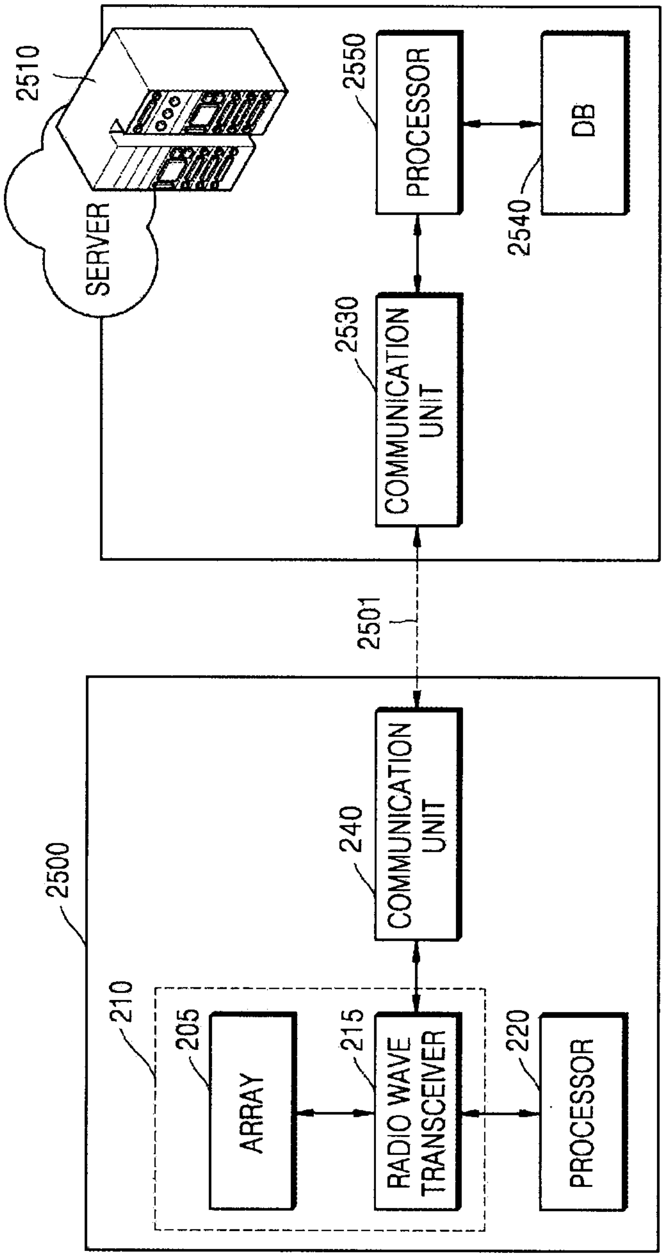
FIG. 26 is a block diagram illustrating a server according to an embodiment of the disclosure.

FIG. 26 is a block diagram illustrating a server according to an embodiment of the disclosure.

Referring to FIG. 26, the vehicle antenna apparatus 2500 may correspond to a vehicle antenna apparatus (e.g., 200 or 500) according to an embodiment of the disclosure. In addition, the vehicle antenna apparatus 2500 may correspond to the vehicle electronic device 300 according to an embodiment of the disclosure. In FIG. 26, the same elements as those of FIGS. 3, 5, and 25 are illustrated by using the same reference numerals. Therefore, descriptions provided above will be omitted.

The vehicle antenna apparatus 2500 may include the array antenna 210, the processor 220 and the communication unit 240. In addition, the array antenna 210 may be integrated with the communication unit 240.

The communication unit 240 communicates with an external device (e.g., the server 2510) through at least one wireless communication network 2501. The external device (not shown) may be a server (e.g., 2510) capable of performing at least one of calculations performed by the vehicle antenna apparatus 2500 or transmitting and receiving data necessary for the vehicle antenna apparatus 2500.

In addition, the communication unit 240 includes at least one communication module, such as a short-range communication module, a wired communication module, a mobile communication module, or a broadcast receiving module. The at least one communication module refers to a tuner that performs broadcast reception or a communication module capable of performing data transmission/reception through a network conforming to communication standards such as Bluetooth, wireless local area network (WLAN) (e.g., Wi-Fi), Wireless Broadband (WiBro), World Interoperability for Microwave Access (WiMax), code-division multiple access (CDMA), wideband CDMA (WCDMA), the Internet, 3G, 4G, 5G, and/or a communication scheme using millimeter waves (mmWave).

For example, when the communication unit 240 performs communication by using millimeter waves (mmWAVE), a large amount of data is quickly transmitted and received. In detail, the vehicle may quickly receive a large amount of data and thus quickly provide data required for safety of the vehicle (e.g., data necessary for autonomous driving, data necessary for a navigation service, and the like), and content for users (e.g., movies, music, and the like), thereby increasing safety of the vehicle and/or user convenience.

In detail, the mobile communication module included in the communication unit 240 may perform communication with another device (e.g., a server (not shown)) at a remote location through a communication network conforming to a communication standard, such as the Internet, 3G, 4G, and/or 5G. A communication module that communicates with a remote server (not shown) may be referred to as a 'long-range communication module'.

In addition, although FIG. 3 illustrates that the communication unit 240 and the array antenna 210 are separate from each other, the communication unit 240 may include the array antenna 210. In detail, at least one communication module included in the communication unit 240 may include the array antenna 210 for transmitting and receiving radio waves.

In addition, the server 2510 includes a communication unit 2530 configured to communicate with a vehicle antenna apparatus installed inside a vehicle, and a processor 2550 configured to perform at least one instruction. Also, the server 2510 may further include a database (DB) 2540.

The communication unit 2530 may include one or more components that enable communication with the vehicle antenna apparatus 2500. The detailed configuration of the communication unit 2530 equally corresponds to the configuration of the communication unit 240 described above, and thus, detailed descriptions thereof will be omitted.

For example, the communication unit 2530 includes at least one communication module configured to perform communication with another device (e.g., the vehicle antenna apparatus 2500) located in a remote location, through a communication network conforming to a communication standard such as the Internet, 3G, 4G, and/or 5G.

The processor 2550 controls the overall operation of the server 2510. For example, the processor 2550 performs required operations by executing at least one of at least one instruction or programs of the server 2510.

The processor 2550 may obtain at least one of the above-described beam selection information and beam codebook by performing computations through the above-described neural network. In addition, the processor 2550 may control the communication unit 2530 to transmit the obtained information to the vehicle antenna apparatus 2500.

In detail, the processor 2550 may train a neural network, which is an AI model, and store the trained neural network. In addition, the server 2510 may obtain at least one of the above-described beam selection information and beam codebook by using the trained neural network.

In general, the vehicle antenna apparatus 2500 may have limited memory capacity, computation processing speed, and training data set collection capability compared to the server 2510. Therefore, an operation requiring a large data storage and a large computation amount may be performed by the server 2510, and then required data and/or an AI model to be used, or the trained neural network may be transmitted to the vehicle antenna apparatus 2500 through a communication network. Then, the vehicle antenna apparatus 2500 may rapidly and easily perform a required operation without a large-capacity memory and a high-speed processor, by receiving and using the required data and AI model from the server.

Figure 27:
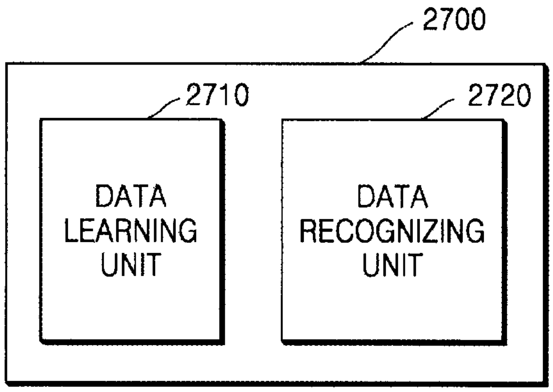
FIG. 27 is a diagram illustrating in detail a processor of a server according to an embodiment of the disclosure.

FIG. 27 is a diagram illustrating in detail a processor of a server according to an embodiment of the disclosure.

A processor 2700 illustrated in FIG. 27 may correspond to a processor (e.g., 220) included in a vehicle electronic device or the processor 2550 of the server 2510 described above with reference to FIGS. 25 and 26. Also, the processor 2700 may be a processor configured to perform computations through the neural network described above with reference to FIG. 24.

Referring to FIG. 27, the processor 2700 may include a data learning unit 2710 and a data recognizing unit 2720.

The data learning unit 2710 may learn a criterion for performing data analysis or judgment of input data in order to derive an intended result. The data learning unit 2710 may learn a criterion for determining a situation by obtaining data to be used for learning and applying the obtained data to a data recognition model.

The data recognizing unit 2720 may determine a situation based on input data. The data recognizing unit 2720 may recognize a situation from certain data by using the trained data recognition model. The data recognizing unit 2720 may determine a certain situation based on certain data by obtaining the data according to a criterion predefined by learning, and using the data recognition model by using the obtained data as an input value. In addition, a result value output by the data recognition model by using the obtained data as the input value may be used to refine the data recognition model.

At least one of the data learning unit 2710 or the data recognizing unit 2720 may be manufactured in the form of at least one hardware chip and then mounted on an electronic device. For example, at least one of the data learning unit 2710 and the data recognizing unit 2720 are manufactured in the form of a dedicated hardware chip for AI, or are manufactured as a part of an existing general-purpose processor (e.g., a central processing unit (CPU) or an AP) or a dedicated graphics processor (e.g., a GPU) and then mounted on various electronic devices described above.

In this case, the data learning unit 2710 and the data recognizing unit 2720 may be mounted on one electronic device or may be mounted on separate electronic devices, respectively. For example, one of the data learning unit 2710 and the data recognizing unit 2720 is included in a vehicle antenna apparatus, and the other is included in a server. In addition, the data learning unit 2710 and the data recognizing unit 2720 are connected to each other in a wired or wireless manner, thus model information generated by the data learning unit 2710 may be provided to the data recognizing unit 2720, and data input to the data recognizing unit 2720 may be provided, as additional training data, to the data learning unit 2710.

Meanwhile, at least one of the data learning unit 2710 and the data recognizing unit 2720 may be implemented as a software module. In a case in which at least one of the data learning unit 2710 and the data recognizing unit 2720 is implemented as a software module (or a program module including instructions), the software module may be stored in a non-transitory computer-readable recording medium. In addition, in this case, the at least one software module may be provided by an OS or a certain application. Alternatively, a part of the at least one software module may be provided by an OS, and the other part may be provided by a certain application.

A method of controlling a vehicle antenna apparatus according to an embodiment of the disclosure may be embodied as program instructions executable by various computer devices, and recorded on a computer-readable medium. In addition, an embodiment of the disclosure may be implemented in a computer-readable recording medium having recorded thereon one or more programs including instructions for executing the method of controlling a vehicle antenna apparatus.

The computer-readable medium may include program instructions, data files, data structures, or the like separately or in combinations. The program instructions to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

The machine-readable storage medium may be provided in the form of a non-transitory storage medium. The term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium includes a buffer in which data is temporarily stored.

According to an embodiment, the method of controlling a vehicle antenna apparatus according to various embodiments disclosed herein may be included in a computer program product and provided. The computer program products may be traded as commodities between sellers and buyers. The computer program product may be distributed in the form of a machine-readable storage medium (e.g., a CD-ROM), or may be distributed online (e.g., downloaded or uploaded) through an application store (e.g., Play Store™) or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

In detail, there may be an implemented computer program product including a recording medium having recorded thereon a program for performing a method of controlling a vehicle antenna apparatus according to an embodiment of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna apparatus of a vehicle comprising:

an array antenna comprising a plurality of antenna elements that output a plurality of beams to form at least one beam pattern; and at least one processor configured to perform at least one instruction, wherein the at least one processor is further configured to:

obtain speed information of the vehicle, group the plurality of antenna elements into at least one group based on the speed information of the vehicle, each of the at least one group being for forming a beam pattern, and control the at least one group of the plurality of antenna elements to output the plurality of beams forming the at least one beam pattern, wherein a number of antenna elements included in each of the at least one group increases according to increase of a speed of the vehicle, and wherein the at least one processor is further configured to control the at least one group of the plurality of antenna elements such that a beam width of the at least one beam pattern when a speed of the vehicle corresponds to a first speed value is narrower than the beam width of the at least one beam pattern when the speed of the vehicle corresponds to a second speed value that is greater than the first speed value.

2. The antenna apparatus of claim 1, wherein the at least one group comprises a plurality of groups for forming a plurality of beam patterns, wherein the at least one processor is further configured to:

select at least one beam from among the plurality of beam patterns based on first information, and control the at least one group of the plurality of antenna elements to output the selected at least one beam pattern, wherein the first information comprises information about radiated power of the array antenna.

3. The antenna apparatus of claim 2, wherein the first information is information about equivalent isotropic radiated power (EIRP) of the array antenna.

4. The antenna apparatus of claim 2, wherein, to control the at least one group of the plurality of antenna elements to output the selected at least one beam, the at least one processor is further configured to adjust at least one of a phase and a signal strength applied to each of the plurality of antenna elements grouped into the at least one group, such that at least one beam pattern from among a plurality of beam patterns is selectively output.

5. The antenna apparatus of claim 1, wherein each of the at least one group comprises at least one adjacent antenna element.

6. The antenna apparatus of claim 1, wherein the at least one processor is further configured to:

classify a speed section of the vehicle into a first speed section and a second speed section, which includes values greater than values included in the first speed section, upon a speed of the vehicle being within the first speed section, group the plurality of antenna elements such that n antenna elements are included in each of the at least one group, and upon the speed of the vehicle being within the second speed section, group the plurality of antenna elements such that m antenna elements are included in each of the at least one group, wherein m is greater than n.

7. The antenna apparatus of claim 1, wherein the at least one processor is further configured to:

classify a speed section of the vehicle into a first speed section, a second speed section, which includes values greater than values included in the first speed section, and a third speed section, which includes values greater than the values included in the second speed section, upon a speed of the vehicle being within the first speed section, group the plurality of antenna elements such that 1 antenna elements are included in each of the at least one group, upon the speed of the vehicle being within the second speed section, group the plurality of antenna elements such that m antenna elements are included in each of the at least one group, wherein m is greater than n, and upon the speed of the vehicle being within the third speed section, group the plurality of antenna elements such that n antenna elements are included in each of the at least one group, wherein n is greater than m.

8. A method performed by an antenna apparatus of a vehicle comprising an array antenna comprising a plurality of antenna elements that output a plurality of beams to form at least one beam pattern, the method comprising:

obtaining, by the antenna apparatus, speed information of the vehicle;

grouping the plurality of antenna elements into at least one group based on the speed information of the vehicle, each of the at least one group being for forming a beam pattern; and controlling, by the antenna apparatus, the at least one group of the plurality of antenna elements to output the plurality of beams forming the at least one beam pattern, wherein a number of antenna elements included in each of the at least one group increases according to increase of a speed of the vehicle, and wherein the controlling the at least one group of the plurality of antenna elements comprises controlling the at least one group such that a beam width of the at least one beam pattern when a speed of the vehicle corresponds to a first speed value is narrower than the beam width of the at least one beam pattern when the speed of the vehicle corresponds to a second speed value that is greater than the first speed value.

9. The method of claim 8, wherein the at least one group comprises a plurality of groups for forming a plurality of beam patterns, and wherein the method further comprises selecting at least one beam pattern from among the plurality of beam patterns based on first information, which is information about radiated power of the array antenna, such that a shape of the at least one beam pattern formed by the at least one group of the plurality of antenna elements is changed according to the speed information.

10. The method of claim 8, wherein a plurality of beam patterns corresponds to a plurality of beam IDs, respectively.

11. The method of claim 10, wherein, when output directions of at least one beam pattern output from a first antenna element and at least one beam pattern output from a second antenna element are the same as or similar to each other, the at least one beam pattern output from the first antenna element and the at least one beam pattern output from the second antenna element may be represented by a same beam ID value.

12. The method of claim 8, further comprising controlling the plurality of antenna elements to output a certain beam pattern by using a beam codebook that defines an antenna element optimized for outputting the certain beam pattern and phase and amplitude values corresponding thereto.

13. One or more non-transitory computer-readable storage media storing one or more computer programs including computer-executable instructions that, when executed by one or more processors of an antenna apparatus individually or collectively, cause the antenna apparatus to perform operations, the antenna apparatus being disposed in a vehicle and comprising an array antenna comprising a plurality of antenna elements that output a plurality of beams to form at least one beam pattern, the operations comprising:

obtaining, by the antenna apparatus, speed information of the vehicle;

grouping the plurality of antenna elements into at least one group based on the speed information of the vehicle, each of the at least one group being for forming a beam pattern; and controlling, by the antenna apparatus, the at least one group of the plurality of antenna elements to output the plurality of beams forming the at least one beam pattern, wherein a number of antenna elements included in each of the at least one group increases and a beam width of the at least one group narrows according to increase of a speed of the vehicle, and wherein the controlling the at least one group of the plurality of antenna elements comprises controlling the at least one group such that a beam width of the at least one beam pattern when a speed of the vehicle corresponds to a first speed value is narrower than the beam width of the at least one beam pattern when the speed of the vehicle corresponds to a second speed value that is greater than the first speed value.

* * * * *